(12) United States Patent
Yatsu et al.

(10) Patent No.: US 11,448,877 B2
(45) Date of Patent: Sep. 20, 2022

(54) PROJECTION OPTICAL SYSTEM AND HEAD-UP DISPLAY

(71) Applicants: Maxell, Ltd., Kyoto (JP); HITACHI INDUSTRY & CONTROL SOLUTIONS, LTD., Hitachi (JP)

(72) Inventors: Masahiko Yatsu, Kyoto (JP); Koji Hirata, Kyoto (JP); Shigeki Hoshino, Kyoto (JP)

(73) Assignees: MAXELL, LTD., Kyoto (JP); HITACHI INDUSTRY & CONTROL SOLUTIONS, LTD., Hitachi (JP)

( * ) Notice: Subject to any disclaimer, the term of this patent is extended or adjusted under 35 U.S.C. 154(b) by 397 days.

(21) Appl. No.: 16/625,357

(22) PCT Filed: Jul. 4, 2017

(86) PCT No.: PCT/JP2017/024545
§ 371 (c)(1),
(2) Date: Dec. 20, 2019

(87) PCT Pub. No.: WO2019/008684
PCT Pub. Date: Jan. 10, 2019

(65) Prior Publication Data
US 2020/0319456 A1 Oct. 8, 2020

(51) Int. Cl.
*G02B 27/01* (2006.01)
*G02B 17/08* (2006.01)
*B60K 35/00* (2006.01)

(52) U.S. Cl.
CPC .......... *G02B 27/0101* (2013.01); *B60K 35/00* (2013.01); *G02B 17/0816* (2013.01);
(Continued)

(58) Field of Classification Search
CPC ............ G02B 27/0101; G02B 27/0149; G02B 17/0816; G02B 17/0621; G02B 13/22;
(Continued)

(56) References Cited

U.S. PATENT DOCUMENTS

2002/0084950 A1  7/2002  Aoki et al.
2004/0156117 A1*  8/2004  Takaura .................. G03B 21/28
                                                              359/651
(Continued)

FOREIGN PATENT DOCUMENTS

CN    205594239 U     9/2016
JP    H05-341226 A    12/1993
(Continued)

OTHER PUBLICATIONS

Tanahashi, Yasuo et al., "Development of Full-Color Head-Up Display Using Laser Projector", Pioneer R&D, vol. 22, pp. 1-7, (2013).
(Continued)

*Primary Examiner* — Brent D Castiaux
(74) *Attorney, Agent, or Firm* — Oliff PLC

(57) ABSTRACT

A projection optical system includes an eyepiece optical system configured to refract and reflect a light emitted from an image forming unit for forming image information to display a virtual image, wherein the eyepiece optical system includes at least a concave lens, a folding mirror, and a concave mirror which are successively placed in order from the image forming unit including a liquid crystal display panel. The projection optical system configured as above is provided on a head-up display.

4 Claims, 22 Drawing Sheets

(52) U.S. Cl.
CPC .. *G02B 27/0149* (2013.01); *B60K 2370/1529* (2019.05); *G02B 2027/015* (2013.01)

(58) Field of Classification Search
CPC ........ G02B 2027/015; G02B 2027/011; G02B 2027/0181; B60K 35/00; B60K 2370/1529
See application file for complete search history.

(56) References Cited

U.S. PATENT DOCUMENTS

| | | | |
|---|---|---|---|
| 2010/0208364 A1* | 8/2010 | Minefuji | G02B 17/0816 359/731 |
| 2011/0317273 A1* | 12/2011 | Kasai | B60K 35/00 359/630 |
| 2012/0099032 A1 | 4/2012 | Ishikawa | |
| 2012/0224062 A1 | 9/2012 | Lacoste et al. | |
| 2014/0268358 A1* | 9/2014 | Kusaka | G02B 5/0278 359/630 |
| 2015/0036108 A1* | 2/2015 | Taniguchi | G02B 26/125 353/102 |
| 2016/0195719 A1 | 7/2016 | Yonetani | |
| 2018/0314063 A1 | 11/2018 | Yatsu et al. | |

FOREIGN PATENT DOCUMENTS

| | | |
|---|---|---|
| JP | 2009-229552 A | 10/2009 |
| JP | 2010-208580 A | 9/2010 |
| JP | 2011-123119 A | 6/2011 |
| JP | 2011-247997 A | 12/2011 |
| JP | 2012-093506 A | 5/2012 |
| WO | 2017/061039 A1 | 4/2017 |

OTHER PUBLICATIONS

Sep. 26, 2017 Search Report issued in International Patent Application No. PCT/JP2017/024545.

Jul. 2, 2021 Office Action issued in Japanese Patent Application No. 2019-528245.

* cited by examiner

FIG. 3

| NOMINAL | SURFACE NO. | SHAPE | CURVATURE RADIUS | INTERPLANAR DISTANCE | GLASS MATERIAL NAME | CONTENT OF DECENTERING/ TILTING | DECENTERING (mm) | | | TILTING (DEGREE) | | |
|---|---|---|---|---|---|---|---|---|---|---|---|---|
| | | | | | | | X-AXIS | Y-AXIS | Z-AXIS | AROUND X-AXIS | AROUND Y-AXIS | AROUND Z-AXIS |
| VIRTUAL IMAGE PLANE | 0 | FLAT SURFACE | ∞ | 4000 | | | | | | | | |
| ENTRANCE PUPIL | 1 | FLAT SURFACE | ∞ | -704.845 | | NORMAL DECENTERING | 0 | 0 | 0 | 0 | 0 | 0 |
| WINDSHIELD | 2 | FREE CURVED SURFACE | ∞ | 0 | REFLECTIVE | DECENTER & RETURN | 355 | 0.1 | -47.52 | -2.9 | 0 | 0 |
| DUMMY SURFACE | 3 | FREE CURVED SURFACE | ∞ | 377.054 | | NORMAL DECENTERING | 0 | 0 | 0 | 0 | 0 | 0 |
| MIRROR | 4 | FREE CURVED SURFACE | -439.799 | 0 | REFLECTIVE | DECENTER & RETURN | 0 | 0 | 0 | -135.9 | -3.387 | 0 |
| DUMMY SURFACE | 5 | FREE CURVED SURFACE | ∞ | -148.816 | | NORMAL DECENTERING | 0 | 0 | 0 | -34.669 | 22.461 | 36.673 |
| MIRROR | 6 | FREE CURVED SURFACE | -207.869 | 0 | REFLECTIVE | DECENTER & RETURN | 0 | 0 | 0 | -33.899 | 36.767 | 0 |
| DUMMY SURFACE | 7 | | ∞ | 66.948 | | NORMAL DECENTERING | 0 | 0 | 0 | 97.652 | -28.792 | 36.1788 |
| | 8 | SPHERICAL SURFACE | -238.059 | 3.200 | FDS90_HOYA | NORMAL DECENTERING | 22.3729 | 54.4406 | 0 | 13.572 | 63.740 | 0 |
| | 9 | FLAT SURFACE | ∞ | 1.240 | | | 0 | 0 | 0 | 98.328 | -50.769 | 99.451 |
| | 10 | FLAT SURFACE | ∞ | 0.400 | 54.57 | NORMAL DECENTERING | -10.316 | -5.081 | 0 | 0 | 0 | 0 |
| | 11 | FLAT SURFACE | ∞ | 0.135 | | | 0 | 0 | 0 | 0 | 0 | 0 |
| | 12 | FLAT SURFACE | ∞ | 0.700 | EAGLE XG | | 0 | 0 | 0 | 0 | 0 | 0 |
| | 13 | FLAT SURFACE | ∞ | 2.000 | | | 0 | 0 | 0 | 0 | 0 | 0 |
| POLARIZATION PLATE/ | 14 | FLAT SURFACE | ∞ | 0.122 | 50.30 | | 0 | 0 | 0 | 0 | 0 | 0 |
| BASE MATERIAL | 15 | FLAT SURFACE | ∞ | 0.600 | 52.649 | | 0 | 0 | 0 | 0 | 0 | 0 |
| | 16 | FLAT SURFACE | ∞ | 0.000 | | | 0 | 0 | 0 | 0 | 0 | 0 |
| INTERMEDIATE IMAGE | 17 | FLAT SURFACE | ∞ | 0.000 | | | 0 | 0 | 0 | 0 | 0 | 0 |

FIG. 4

| CODE | | MIRROR SURFACE (2ND) | MIRROR SURFACE (4TH) | MIRROR SURFACE (6TH) |
|---|---|---|---|---|
| R | $1/c$ | ∞ | −439.799 | −207.869 |
| K | K | | −3.87510 | 1.36894 |
| C2 | $X$ | | −5.12341E−01 | 4.35931E−01 |
| C3 | $Y$ | 2.02674E+00 | −2.82735E−02 | 8.79301E−01 |
| C4 | $X^2$ | 4.32895E−04 | −5.56666E−04 | 8.38967E−03 |
| C5 | $XY$ | | 7.53507E−04 | 1.03096E−04 |
| C6 | $Y^2$ | 1.28151E−03 | −2.27791E−04 | 2.42668E−03 |
| C7 | $X^3$ | | −3.17036E−06 | 5.62105E−06 |
| C8 | $X^2Y$ | −3.06597E−07 | 3.14857E−06 | 4.81349E−05 |
| C9 | $XY^2$ | | 2.41189E−07 | 1.09631E−04 |
| C10 | $Y^3$ | 1.68099E−06 | −2.97189E−07 | 3.12143E−04 |
| C11 | $X^4$ | −6.86315E−10 | −6.17627E−09 | 1.78767E−07 |
| C12 | $X^3Y$ | | 2.20269E−08 | −6.90475E−07 |
| C13 | $X^2Y^2$ | −8.81233E−10 | 4.21004E−09 | 9.55805E−07 |
| C14 | $XY^3$ | | 1.43955E−08 | 7.19603E−06 |
| C15 | $Y^4$ | 2.99773E−09 | −3.91628E−10 | −1.23881E−05 |
| C16 | $X^5$ | | 5.98834E−11 | 2.61982E−10 |
| C17 | $X^4Y$ | 1.32167E−12 | 2.19651E−10 | −8.21653E−09 |
| C18 | $X^3Y^2$ | | 1.65276E−10 | 7.80924E−09 |
| C19 | $X^2Y^3$ | 3.30564E−13 | 1.23621E−10 | 2.09962E−08 |
| C20 | $XY^4$ | | 6.27976E−11 | −7.26073E−07 |
| C21 | $Y^5$ | 8.08674E−12 | 1.59758E−11 | −1.38861E−07 |
| C22 | $X^6$ | 2.70138E−15 | −1.84217E−13 | 7.15141E−13 |
| C23 | $X^5Y$ | | −1.48829E−12 | 4.91582E−11 |
| C24 | $X^4Y^2$ | 9.37129E−15 | −2.12126E−12 | 1.59732E−10 |
| C25 | $X^3Y^3$ | | −8.37395E−13 | −7.33607E−10 |
| C26 | $X^2Y^4$ | 4.00246E−15 | 1.35449E−12 | −8.78307E−09 |
| C27 | $XY^5$ | | 1.28385E−12 | 4.51611E−09 |
| C28 | $Y^6$ | 4.43569E−14 | 5.30711E−13 | 3.07818E−08 |
| C29 | $X^7$ | | −1.08116E−14 | −1.68148E−14 |
| C30 | $X^6Y$ | −2.36824E−18 | −1.93344E−14 | 9.73644E−14 |
| C31 | $X^5Y^2$ | | −6.33395E−14 | −1.50987E−12 |
| C32 | $X^4Y^3$ | 5.38168E−18 | −9.22403E−14 | −6.13640E−12 |
| C33 | $X^3Y^4$ | | −8.03439E−14 | 1.61989E−11 |
| C34 | $X^2Y^5$ | −2.98776E−17 | −4.06256E−14 | 1.03526E−10 |
| C35 | $XY^6$ | | −8.93009E−15 | 9.93261E−10 |
| C36 | $Y^7$ | 6.01164E−17 | −7.05415E−16 | −3.50512E−10 |
| C37 | $X^8$ | −6.02567E−21 | 8.11450E−17 | 1.81568E−16 |
| C38 | $X^7Y$ | | 3.73961E−16 | −2.09761E−15 |
| C39 | $X^6Y^2$ | −2.72490E−20 | 1.50530E−15 | −1.15863E−14 |
| C40 | $X^5Y^3$ | | 2.75364E−15 | −6.97829E−14 |
| C41 | $X^4Y^4$ | −6.63800E−21 | 2.60185E−15 | 4.86195E−13 |
| C42 | $X^3Y^5$ | | 1.15304E−15 | −2.03175E−12 |
| C43 | $X^2Y^6$ | 9.03094E−21 | −3.87456E−17 | 4.42453E−12 |
| C44 | $XY^7$ | | −2.50514E−16 | −1.68495E−11 |
| C45 | $Y^8$ | −1.39411E−18 | −6.96267E−17 | −6.42760E−12 |
| C46 | $X^9$ | | 1.20414E−20 | 3.78987E−18 |
| C47 | $X^8Y$ | 2.16909E−24 | −1.29262E−18 | 8.41060E−18 |
| C48 | $X^7Y^2$ | | 1.84897E−18 | 2.57779E−16 |
| C49 | $X^6Y^3$ | −1.37545E−23 | 3.30274E−18 | −1.01708E−15 |
| C50 | $X^5Y^4$ | | 2.91467E−18 | −2.12266E−15 |
| C51 | $X^4Y^5$ | 3.30130E−25 | 5.01638E−18 | −4.22717E−14 |
| C52 | $X^3Y^6$ | | 7.49234E−18 | −7.01035E−14 |
| C53 | $X^2Y^7$ | 2.06944E−21 | 3.98559E−18 | −2.05819E−13 |
| C54 | $XY^8$ | | 5.19428E−19 | −1.00202E−13 |
| C55 | $Y^9$ | −9.09789E−21 | −8.23814E−20 | 4.88518E−13 |
| C56 | $X^{10}$ | 5.77377E−27 | 6.57608E−21 | 2.38457E−20 |
| C57 | $X^9Y$ | | 2.56307E−20 | 5.59064E−20 |
| C58 | $X^8Y^2$ | 2.89400E−26 | −5.05127E−20 | 1.71330E−18 |
| C59 | $X^7Y^3$ | | −1.93954E−19 | −4.62062E−18 |
| C60 | $X^6Y^4$ | 9.76444E−28 | −2.67552E−19 | −2.40050E−17 |
| C61 | $X^5Y^5$ | | −2.05678E−19 | −1.78439E−16 |
| C62 | $X^4Y^6$ | 4.46248E−26 | −9.44755E−20 | −4.91916E−16 |
| C63 | $X^3Y^7$ | | −5.04679E−21 | −7.44237E−16 |
| C64 | $X^2Y^8$ | 6.07550E−24 | 4.09767E−20 | 4.58832E−16 |
| C65 | $XY^9$ | | 2.85946E−20 | 4.72946E−15 |
| C66 | $Y^{10}$ | −1.70700E−23 | 5.91775E−21 | −8.01178E−15 |

FIG. 10

| NOMINAL | SURFACE NO. | SHAPE | CURVATURE RADIUS | INTERPLANAR DISTANCE | GLASS MATERIAL NAME | CONTENT OF DECENTERING/ TILTING | DECENTERING (mm) | | | TILTING (DEGREE) | | |
|---|---|---|---|---|---|---|---|---|---|---|---|---|
| | | | | | | | X-AXIS | Y-AXIS | Z-AXIS | AROUND X-AXIS | AROUND Y-AXIS | AROUND Z-AXIS |
| VIRTUAL IMAGE PLANE | 0 | FLAT SURFACE | ∞ | 20000 | | | | | | | | |
| ENTRANCE PUPIL | 1 | FLAT SURFACE | ∞ | -746.118 | | NORMAL DECENTERING | 0 | 0 | 0 | -2.376 | 0 | 0 |
| WINDSHIELD | 2 | FREE CURVED SURFACE | ∞ | 0 | REFLECTIVE | DECENTER & RETURN | -370 | 0 | 0 | 0 | 0 | 0 |
| DUMMY SURFACE | 3 | FLAT SURFACE | ∞ | 370.031 | | NORMAL DECENTERING | 0 | 0 | 0 | -136.99 | 14.157 | -46.686 |
| MIRROR | 4 | FREE CURVED SURFACE | -755.447 | 0 | REFLECTIVE | DECENTER & RETURN | 0 | 0 | 0 | -37.558 | -49.545 | 0 |
| DUMMY SURFACE | 5 | FREE CURVED SURFACE | ∞ | -235.821 | | NORMAL DECENTERING | 0 | 0 | 0 | -22.259 | -18.429 | 0 |
| MIRROR | 6 | FREE CURVED SURFACE | 1907.471 | 0 | REFLECTIVE | DECENTER & RETURN | 0 | 0 | 0 | 20.243 | 7.679 | 54.336 |
| DUMMY SURFACE | 7 | FLAT SURFACE | ∞ | 195.029 | | NORMAL DECENTERING | 0 | 0 | 0 | 18.595 | -7.947 | 0 |
| | 8 | SPHERICAL SURFACE | -196.735 | 6.500 | "PMMA25" | NORMAL DECENTERING | -5.5384 | -6.884 | 0 | 5.212 | 26.186 | 1.562 |
| | 9 | FLAT SURFACE | ∞ | 1.240 | | | 0 | 0 | 0 | 0 | 0 | 0 |
| | 10 | FLAT SURFACE | ∞ | 0.400 | 54.57 | NORMAL DECENTERING | 11.503 | 72.786 | 0 | 0 | 0 | 0 |
| | 11 | FLAT SURFACE | ∞ | 0.135 | | | 0 | 0 | 0 | 0 | 0 | 0 |
| | 12 | FLAT SURFACE | ∞ | 0.700 | EAGLE_XG' | | 0 | 0 | 0 | 0 | 0 | 0 |
| | 13 | FLAT SURFACE | ∞ | 2.000 | | | 0 | 0 | 0 | 0 | 0 | 0 |
| POLARIZATION PLATE/ BASE MATERIAL | 14 | FLAT SURFACE | ∞ | 0.122 | 50.30 | | 0 | 0 | 0 | 0 | 0 | 0 |
| | 15 | FLAT SURFACE | ∞ | 0.600 | 52.649 | | 0 | 0 | 0 | 0 | 0 | 0 |
| | 16 | FLAT SURFACE | ∞ | 0.000 | | | 0 | 0 | 0 | 0 | 0 | 0 |
| INTERMEDIATE IMAGE | 17 | FLAT SURFACE | ∞ | 0.000 | | | 0 | 0 | 0 | 0 | 0 | 0 |

FIG. 11

| CODE | | MIRROR SURFACE (2ND) | MIRROR SURFACE (4TH) | MIRROR SURFACE (6TH) |
|---|---|---|---|---|
| R | $1/c$ | ∞ | −755.447 | 1907.471 |
| K | K | | | |
| C2 | $X$ | | 1.25953E+00 | |
| C3 | $Y$ | 1.71371E+00 | −2.81733E−02 | |
| C4 | $X^2$ | 2.11497E−04 | −1.04133E−03 | −1.26442E−04 |
| C5 | $XY$ | | 2.35227E−04 | 6.42484E−04 |
| C6 | $Y^2$ | 6.59378E−04 | −3.36294E−05 | 1.71447E−04 |
| C7 | $X^3$ | | 2.09315E−06 | 6.12582E−07 |
| C8 | $X^2Y$ | 4.25207E−08 | 1.33709E−06 | 2.67252E−06 |
| C9 | $XY^2$ | | −1.47048E−06 | 1.01803E−06 |
| C10 | $Y^3$ | 1.26547E−06 | 7.63174E−07 | 1.94118E−06 |
| C11 | $X^4$ | 1.64270E−10 | 4.75133E−10 | 3.97592E−08 |
| C12 | $X^3Y$ | | 2.42697E−09 | 5.03494E−08 |
| C13 | $X^2Y^2$ | 6.15087E−10 | −3.64203E−09 | 1.29003E−08 |
| C14 | $XY^3$ | | 1.52920E−08 | −2.02078E−08 |
| C15 | $Y^4$ | 2.83442E−09 | −3.50653E−09 | 1.03880E−08 |
| C16 | $X^5$ | | 4.70307E−11 | −1.84142E−10 |
| C17 | $X^4Y$ | 3.26009E−13 | 3.32731E−11 | −1.59150E−10 |
| C18 | $X^3Y^2$ | | −8.87863E−11 | 3.38578E−10 |
| C19 | $X^2Y^3$ | 4.31944E−13 | 1.36369E−10 | 4.55269E−10 |
| C20 | $XY^4$ | | −2.28233E−10 | 5.90421E−11 |
| C21 | $Y^5$ | 6.34787E−12 | 5.07399E−11 | 1.85172E−10 |
| C22 | $X^6$ | −1.79571E−16 | 2.03620E−12 | −9.18647E−13 |
| C23 | $X^5Y$ | | 1.11930E−12 | 2.73804E−13 |
| C24 | $X^4Y^2$ | 1.01472E−15 | −3.71392E−12 | −2.28358E−13 |
| C25 | $X^3Y^3$ | | −1.50347E−13 | −1.91662E−13 |
| C26 | $X^2Y^4$ | 2.09594E−15 | 1.68424E−12 | −3.22905E−14 |
| C27 | $XY^5$ | | 4.74714E−14 | −1.46381E−12 |
| C28 | $Y^6$ | 2.84130E−14 | 8.60663E−14 | 1.20752E−12 |
| C29 | $X^7$ | | 1.08984E−14 | 9.14982E−15 |
| C30 | $X^6Y$ | 2.46373E−19 | −3.41792E−14 | −1.59473E−14 |
| C31 | $X^5Y^2$ | | −3.40343E−14 | −4.93238E−15 |
| C32 | $X^4Y^3$ | 4.84044E−18 | 4.03017E−14 | 8.38838E−15 |
| C33 | $X^3Y^4$ | | 1.05545E−14 | 6.97905E−15 |
| C34 | $X^2Y^5$ | 1.26319E−17 | −1.48229E−14 | −1.23910E−15 |
| C35 | $XY^6$ | | 1.75517E−15 | −6.31696E−15 |
| C36 | $Y^7$ | 1.77903E−16 | −9.56099E−16 | 6.43321E−15 |
| C37 | $X^8$ | 2.18437E−22 | 1.56878E−16 | −1.54129E−17 |
| C38 | $X^7Y$ | | −2.95528E−16 | 9.31649E−17 |
| C39 | $X^6Y^2$ | 1.18014E−21 | 5.03957E−16 | −7.72250E−17 |
| C40 | $X^5Y^3$ | | −2.37349E−16 | 2.03982E−17 |
| C41 | $X^4Y^4$ | 8.45508E−21 | 8.09206E−17 | 1.03375E−16 |
| C42 | $X^3Y^5$ | | −4.32573E−18 | −4.39516E−17 |
| C43 | $X^2Y^6$ | 2.05883E−20 | −8.88028E−17 | −9.02513E−17 |
| C44 | $XY^7$ | | 6.34961E−17 | 4.33443E−17 |
| C45 | $Y^8$ | 4.65954E−19 | −1.10064E−17 | 5.05230E−17 |
| C46 | $X^9$ | | 1.09382E−19 | 7.56087E−20 |
| C47 | $X^8Y$ | | −1.30295E−18 | 2.92719E−19 |
| C48 | $X^7Y^2$ | | 2.17407E−18 | 1.03826E−18 |
| C49 | $X^6Y^3$ | | −2.10895E−18 | −2.30419E−19 |
| C50 | $X^5Y^4$ | | 1.99771E−19 | 6.07464E−20 |
| C51 | $X^4Y^5$ | | 1.71082E−18 | 1.70643E−18 |
| C52 | $X^3Y^6$ | | −1.78696E−18 | 6.70262E−19 |
| C53 | $X^2Y^7$ | | 8.93036E−19 | −1.15468E−18 |
| C54 | $XY^8$ | | −2.99811E−19 | −5.03954E−19 |
| C55 | $Y^9$ | | 6.24459E−20 | −2.11913E−21 |
| C56 | $X^{10}$ | | 9.97285E−21 | −1.69648E−22 |
| C57 | $X^9Y$ | | −1.87270E−20 | −1.74471E−21 |
| C58 | $X^8Y^2$ | | 9.23135E−21 | −4.27958E−21 |
| C59 | $X^7Y^3$ | | −9.25386E−22 | 2.51079E−23 |
| C60 | $X^6Y^4$ | | −1.32031E−21 | 4.49277E−21 |
| C61 | $X^5Y^5$ | | 6.29132E−21 | 1.26466E−21 |
| C62 | $X^4Y^6$ | | −8.34894E−21 | −2.54772E−21 |
| C63 | $X^3Y^7$ | | 2.53867E−21 | −1.89300E−22 |
| C64 | $X^2Y^8$ | | 1.54568E−21 | 2.61127E−21 |
| C65 | $XY^9$ | | −8.72158E−22 | 2.87462E−21 |
| C66 | $Y^{10}$ | | 7.04802E−23 | 8.18999E−22 |

PROJECTION OPTICAL SYSTEM AND HEAD-UP DISPLAY

TECHNICAL FIELD

The present invention relates to a projection optical system and a head-up display.

BACKGROUND ART

There is known a head-up display configured to project an image on a windscreen (windshield) provided in a mobile object such as a vehicle and an airplane, which enables a projected image to be observed as a virtual image through the windshield.

For example, Patent Literature 1 discloses a conventional head-up display configured to "include a projection optical system that irradiates the light from behind a transmissive liquid crystal display panel to enlarge and project an image displayed on the liquid crystal display panel (excerpted from the Abstract)".

Furthermore, Patent literature 2 discloses "A display apparatus . . . includes first and second mirrors in order along an optical path from the display device to a viewer (to guide the image to a viewer's viewpoint area to display a virtual image). The apparatus satisfies conditions of θx>θy (θx: an incident angle in a longitudinal direction of the image on the first mirror, θy: an incident angle in a crosswise direction of the image on the first mirror) and 0.2<D1/Lh<0.9 (D1: a distance between an image display surface of the display device and the first mirror (an optical path length at a center of the viewpoint area, Lh: a horizontal width of a virtual image visually recognized by the viewer) (excerpted from the Abstract)".

Still further, Patent Literature 3 discloses "a correction member, disposed between the windshield and the display device, transmits and corrects an image projected on the front glass . . . so that distortion of the image, which is seen from the eye point, arising from non-plane of the projection area is canceled out" (excerpted from the Abstract).

Still further, Non-Patent Literature 1 discloses a head-up display in which a screen is tilted and a convex lens as a field lens is arranged in order to correct distortion caused by a concave mirror.

CITATION LIST

Patent Literature

Patent Literature 1: JP 2009-229552 A
Patent Literature 2: US 2016/195719 A1
Patent Literature 3: US 2002/084950 A1

Non-Patent Literature

Non-Patent Literature 1: PIONEER R&D (Vol. 22, 2013)

SUMMARY OF INVENTION

In Patent Literature 2, an example of a thin head-up display which is achieved by horizontally repositioning the display apparatus and a rotationally asymmetric mirror is disclosed. However, the first embodiment of the Patent Literature 2 uses a horizontally long virtual image sized as 140 by 70 mm. A light flux is curved in a horizontal direction that ensures a light flux size twice as large as the vertical size. Therefore, the curved mirror is large sized. Even the thin head-up display makes it difficult to reduce a cubic capacity of the head-up display.

In Patent Literature 3, an example of a head-up display for correcting distortion caused by non-planarity of a projection area of a windshield is disclosed, however, distortion caused by a concave mirror disclosed in Non-Patent Literature 1 is not considered. Meanwhile, in Non-Patent Literature 1, in order to correct the distortion caused by the concave mirror, a screen is tilted and a convex lens as a field lens is arranged, however, telecentricity on the liquid crystal display panel disclosed in Patent Literature 1 is not satisfied. In this way, with regard to a projection optical system and a head-up display, there is room for further improvement in achieving reduction in the size of a head-up display while securing necessary performance.

The present invention has been made in consideration of the foregoing. An objective of the present invention is to reduce the size of a head-up display while securing telecentricity.

Solution to Problem

In order to solve the above-described problems, the present invention provides configurations as set forth in the claims. As one of the aspects according to the present invention, a projection optical system comprises an eyepiece optical system configured to refract and reflect a light emitted from an image forming unit for forming image information to display a virtual image, wherein the eyepiece optical system includes at least a concave lens, a folding mirror, and a concave mirror which are successively placed in order from the image forming unit.

Advantageous Effects of Invention

According to the present invention, it is possible to reduce the size of a head-up display while securing telecentricity. The problems, configurations, and advantageous effects of the present invention other than those described above will be clarified in the following description of the embodiments.

BRIEF DESCRIPTION OF DRAWINGS

FIG. 3 illustrates lens data of a head-up display according to the first embodiment.

FIG. 4 illustrates free curved surface coefficients for the eyepiece optical system according to the first embodiment.

FIG. 10 illustrates lens data of the eyepiece optical system according to the second embodiment.

FIG. 11 illustrates free curved surface coefficients for the eyepiece optical system according to the second embodiment.

DESCRIPTION OF EMBODIMENTS

Hereinafter, an embodiment and various examples of the present invention will be described with reference to the drawings, etc. In the following, specific examples of the present invention will be described, on the other hand, the present invention is not limited to the description thereof, but various modifications and corrections can be made by those skilled in the art within the scope of the technical idea disclosed in the present specification. Throughout all drawings illustrating the present invention, elements having the same function are provided with the same reference signs and repetitive explanation therefor may be omitted.

Figure 16:
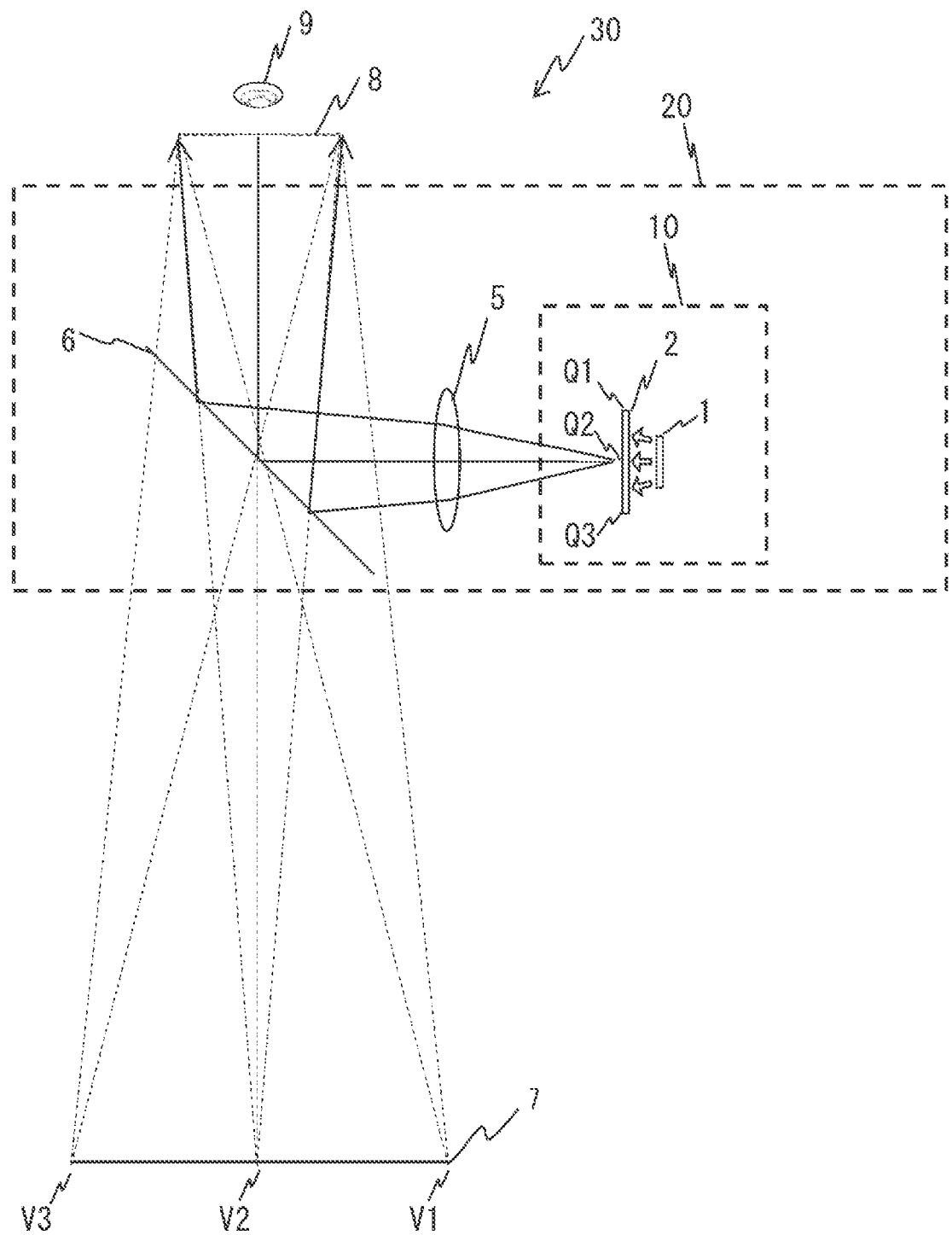
FIG. 16 is a schematic configuration diagram illustrating an image forming unit as an example of a head-up display according to the present embodiments.

In the following, a basic configuration of a head-up display 30 will be described with reference to FIG. 16. FIG. 16 is a schematic configuration diagram illustrating an image forming unit as an example of the head-up display according to the present embodiments.

The head-up display 30 illustrated in FIG. 16 is provided with a projection optical system 20 that includes an image forming unit 10 and an eyepiece optical system 5. The head-up display 30 is configured to allow the projection optical system 20 to radiate an image light, reflect the image light on a windshield 6 of an automobile (not illustrated), and makes the image light incident on an observer's eye 9.

More specifically, a pupil position of the eyepiece optical system on a side of the image forming unit is formed rearward of a liquid crystal display panel 2 when viewed from a side of the eyepiece optical system, as well as a pupil position of the image forming unit 10 on the side of the eyepiece optical system is formed in front of the liquid crystal display panel 2. This configuration causes the observer's eye 9 to virtually view image information on a virtual image plane 7.

Figure 19:
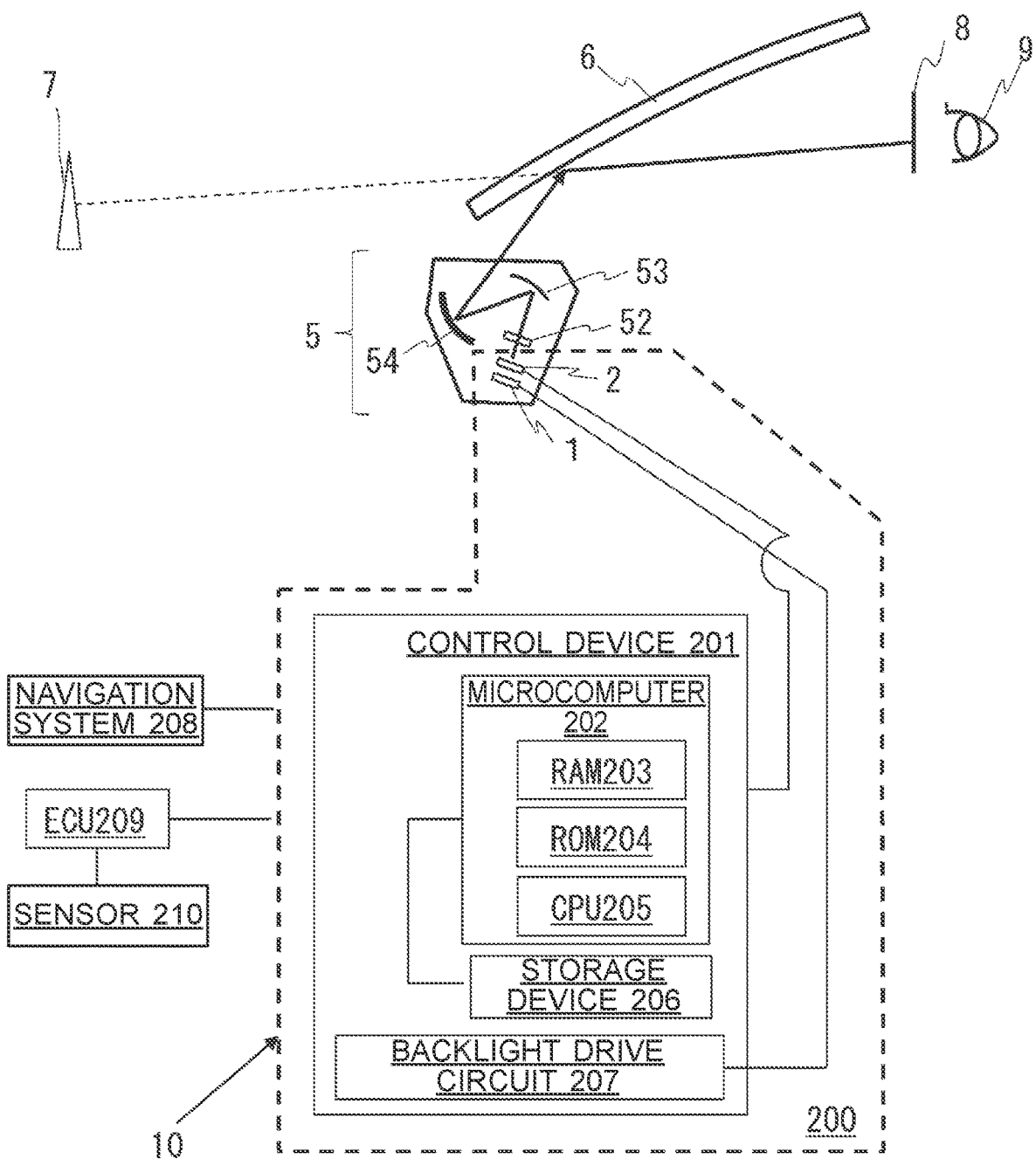
FIG. 19 is a functional block diagram of the image forming unit.

Firstly, the image forming unit 10 will be described with reference to FIG. 19. FIG. 19 is a functional block diagram of the image forming unit. As illustrated in FIG. 19, the image forming unit 10 includes a liquid crystal display panel 2, a backlight 1, and a controller 200 for controlling operations thereof. The image forming unit 10 is configured to radiate a light from the backlight 1 onto the liquid crystal display panel 2 and emitted image light that includes an image information displayed on the liquid crystal display panel 2 to the eyepiece optical system 5.

The controller 200 includes a control device 201. The control device 201 is supplied with various information from an external device. The control device 201 is connected to a navigation system 208 or an ECU (Electronic Control Unit) 209, for example. The navigation system 208 is provided as a navigation device and generates and outputs information about the operation of a mobile object mounted with the head-up display 30. The ECU 209 controls the operation of the mobile object. Various types of sensors 210 provided in the mobile object are connected to the ECU 209 and notify the ECU 209 of the detected information.

The controller 200 includes the control device 201 and a backlight drive circuit 207. The control device 201 processes various data from the external device described above. The backlight drive circuit 207 drives the backlight 1.

The control device 201 includes a microcomputer 202 and a storage 206 connected to the microcomputer 202.

The microcomputer 202 includes a RAM (Random Access Memory) 203, a CPU (Central Processing Unit) 205, and a ROM (Read Only Memory) 204. The RAM 203 stores various data from the external device. The CPU 205 performs arithmetic processing to generate image data as a source of a virtual image viewed by an observer. The ROM 204 stores programs and parameters capable of performing the arithmetic processing in the CPU 205.

The controller 200 configured as above displays image information on the liquid crystal display panel 2 included in the image forming unit 10. The image forming unit 10 emits an image light flux including the image information displayed on the liquid crystal display panel 2 based on a light flux radiated from the backlight 1.

Return to FIG. 16. The eyepiece optical system 5 projects the image light flux emitted from the image forming unit 10 onto the windshield 6. The image light flux projected on the windshield 6 is reflected thereby and reaches the position of the observer's eye 9. This constitutes the relationship as if the observer's eye 9 were viewing the image information on the virtual image plane 7.

As illustrated in FIG. 16, suppose virtual points Q1, Q2, and Q3 on a surface of the liquid crystal display panel 2 where the image light flux is emitted. The image light flux is emitted from these virtual points and respectively correspond to virtual points V1, V2, and V3 on the virtual image plane 7 as illustrated in FIG. 16. An eye box 8 is a range in which the points V1, V2, and V3 on the virtual image plane 7 can be viewed by the observer's eye 9 even with repositioning the observer's eye 9. As described above, the eyepiece optical system 5 displays an image (virtual image) of an object (space image) in front of the observer in the same way as an eyepiece lens used for a camera finder or a microscope displays.

Figure 20:
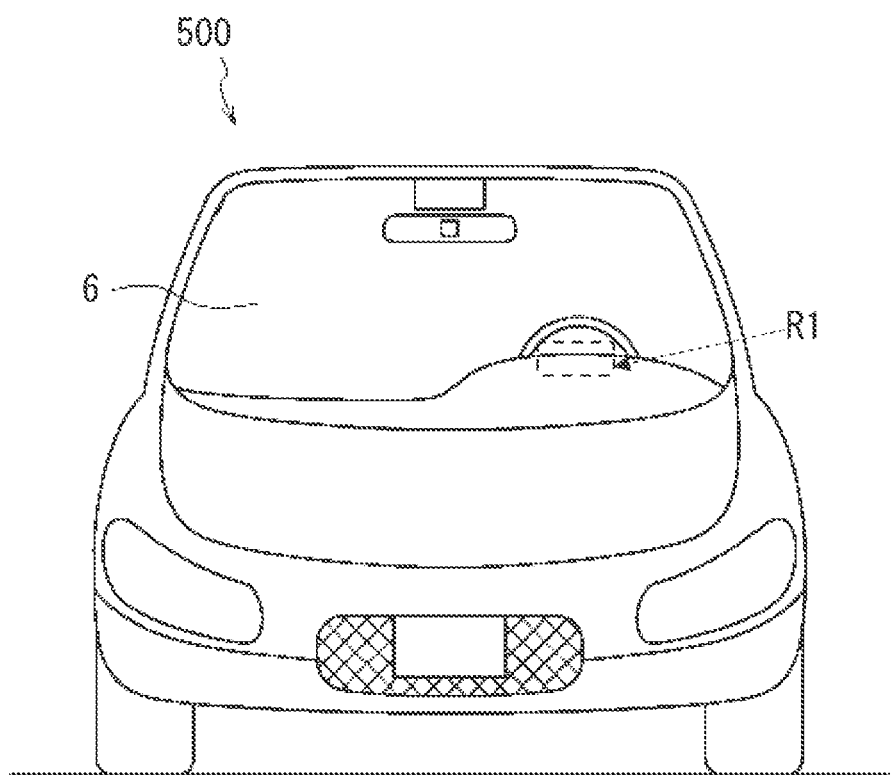
FIG. 20 is an explanatory diagram of a projection area of a head-up display in an automobile.

In the following, an example in which the head-up display 30 according to the present embodiment is mounted on a mobile object will be described with reference to FIG. 20. FIG. 20 is a plan view of an automobile 500 which is a mobile object viewed from the front. The automobile 500 as illustrated in FIG. 20 is provided with the windshield 6 which is a windscreen arranged in front of the driver's seat.

The head-up display 30 projects an image light flux onto the windshield 6 and thereby enables an observer at the driver's seat to view various information about operations of the automobile 500 as a virtual image. The image light flux is projected in front of the driver's seat or its vicinity. For example, the image light flux is projected onto a position such as a rectangular region R1 drawn with a broken line.

Next, the features derived from the basic configuration of the head-up display 30 will be described below.

As the 5th page of Patent Literature 1 (paragraph [0022]) states that "the relay lens condenses the telecentric display light emitted from the liquid crystal display panel", in the combination of the normal liquid crystal display panel 2 and the backlight 1, the irradiation light becomes telecentric on the incidence and emission side of the liquid crystal display panel 2.

Figure 15:
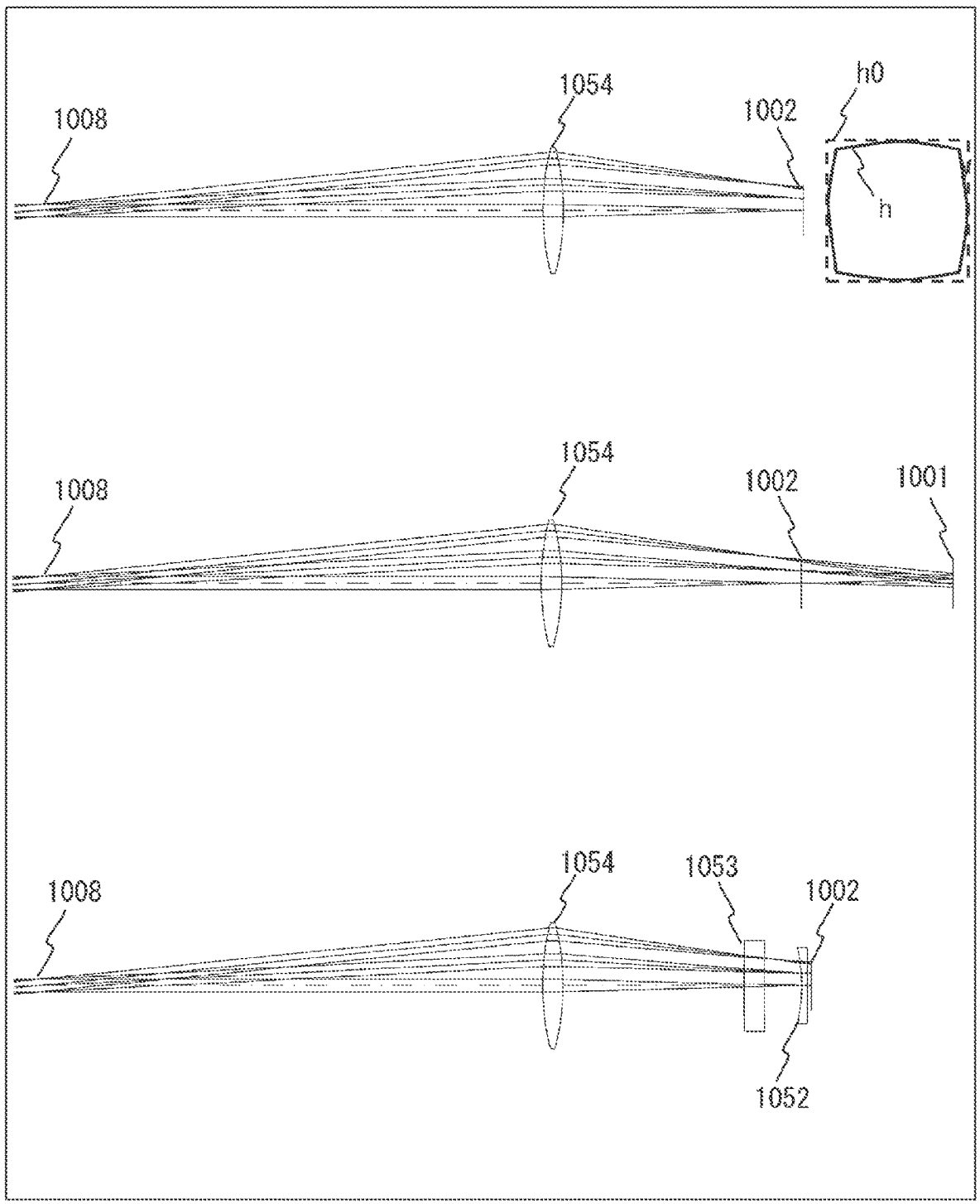
FIG. 15 is an explanatory diagram of a pupil position at a head-up display.

In order to satisfy the telecentricity (exit pupil distance is infinite) on the side of liquid crystal display panel 2 of FIG. 15, it is necessary to arrange a concave lens having negative refractive power (=power) as a field lens immediately in front of the liquid crystal display panel 2.

In the following, the action of the field lens will be described with reference to FIG. 15. FIG. 15 is an explanatory diagram of a pupil position of the head-up display. In an upper stage of FIG. 15, a diaphragm 1008 is disposed apart from a convex lens 1054 (corresponding to a concave mirror 54) by a distance which is longer than a focal distance of the convex lens 1054. In this configuration, a principal ray passing through the center of the diaphragm 1008 is refracted by large power of the convex lens 1054, and converges to enter an image plane 1002. At the same time, due to aberration generated by the convex lens 1054, the height-h of the actual ray on the image plane 1002 becomes smaller than the height-h0 of the paraxial ray on the image plane 1002, and thereby barrel-shaped distortion occurs on the image plane 1002.

The middle stage of FIG. 15 is a light-tracing diagram in which rearward side of the image plane 1002 is illustrated in order to show a condensing position 1001, from which it can be confirmed that telecentricity is deteriorated.

The lower part of FIG. 15 illustrates a basic configuration provided for correcting telecentricity and distortion. As compared with the configuration illustrated in the middle stage of FIG. 15, because a concave lens 1052 having a focal distance corresponding to the distance between the image plane 1002 and the condensing position 1001 is arranged in front of the image plane 1002, improvement of telecentricity can be mainly achieved.

Here, by arranging, separately from the concave lens 1052, an optical element 1053 having free curved surface shape, the difference in the positions of the optical element 1053 and the concave lens 1052, that is, the difference in the height of rays becomes effective for correcting telecentricity and distortion.

The optical element 1053 having free curved surface shape includes an XY polynomial (the detailed definition formula will be described later). Accordingly, it is possible to provide laterally asymmetric and vertically asymmetric actions, and thus it is also effective for correcting laterally asymmetric and vertically asymmetric distortion performance occurring on the windshield 6.

Furthermore, as a desirable condition, the concave lens 1052 is arranged to be close to the liquid crystal display panel 2, and accordingly, the concave lens 1052 and the liquid crystal display panel 2 can be easily held by making a surface of the concave lens 1052 which is closer to the liquid crystal display panel 2 plane. On the contrary, when making a surface of the concave lens 1052 on the liquid crystal display panel 2 side concave, the end of the concave surface becomes close to the liquid crystal display panel 2, and accordingly, it is necessary to arrange the concave lens 1052 itself apart from the liquid crystal display panel 2. Moreover, because the displayable range of pixels on the liquid crystal display panel 2 is larger than the effective size of the image light on the liquid crystal display panel 2 and structures exist on the outside thereof, it is necessary to arrange the concave lens 1052 farther apart from the liquid crystal display panel 2 in order to avoid structural interference with the liquid crystal display panel 2.

Next, a first embodiment of a projection optical system using a concave mirror 54, a folding mirror 53, and a concave lens 52, which can realize the small sized head-up display 30 will be described.

First Embodiment

Figure 1A:
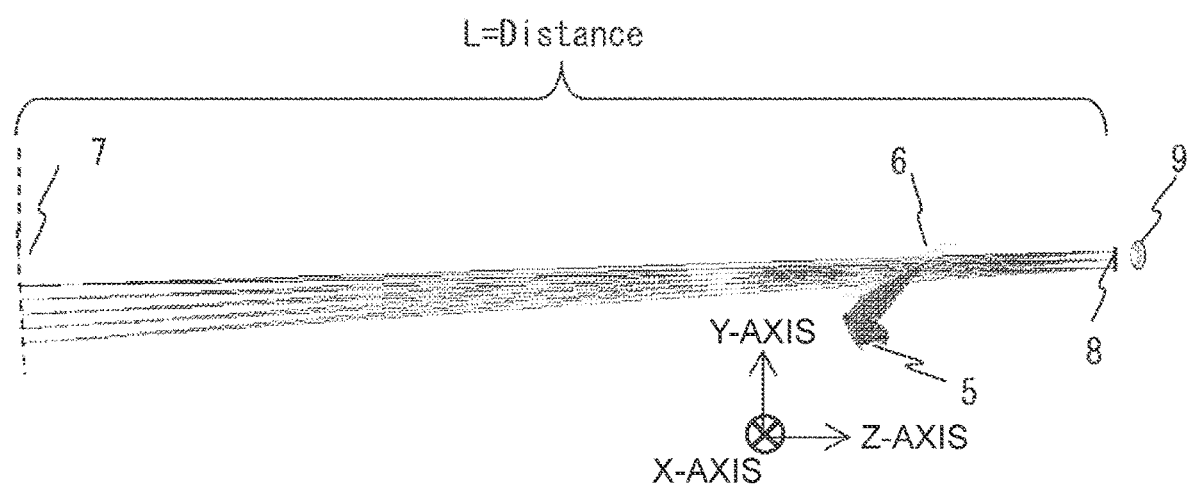
FIG. 1A is an overall ray diagram (YZ-plane) illustrating an eyepiece optical system according to a first embodiment.
Figure 1B:
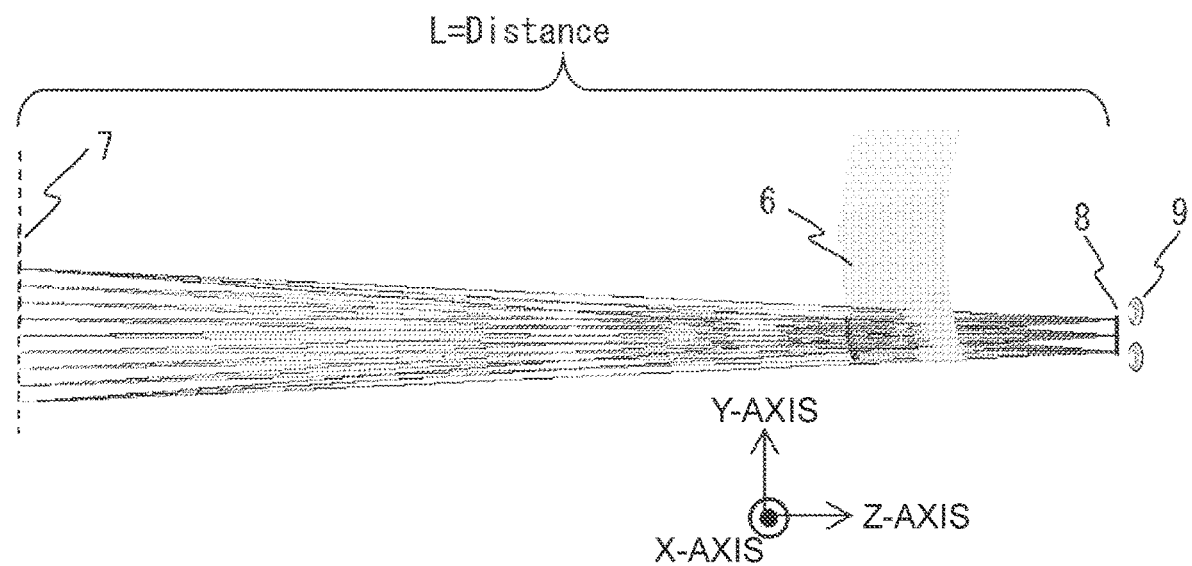
FIG. 1B is an overall ray diagram (XZ-plane) illustrating the eyepiece optical system according to the first embodiment.

The first embodiment is characterized in the configuration of the eyepiece optical system 5 in the head-up display 30 illustrated in FIG. 16. In the following, the windshield 6 and the eyepiece optical system 5 which constitute the projection optical system will be described with reference to FIG. 1. FIG. 1 is an overall ray diagram of the eyepiece optical system 5 according to the first embodiment, especially, FIG. 1A illustrates that the observer's eye 9 is directed to image information on the virtual image plane 7 in a YZ-plane defined by the horizontal X-axis, the vertical Y-axis, and the Z-axis orthogonal to the XY-axis of the eye box 8. FIG. 1B illustrates that the observer's eye 9 is directed to image information on the virtual image plane 7 in an XZ plane. Here, in the YZ plane, the left and right eyes of the observer's eye 9 are positioned at the same level (see the reference sign 9), while in the XZ plane, the left and right eyes of the observer's eye 9 are positioned at different levels. The windshield 6 is formed symmetric with respect to the left-right direction of the automobile, and accordingly, a range in the windshield 6 through which an effective light flux in the head-up display 30 passes is displayed symmetrically.

Figure 2:
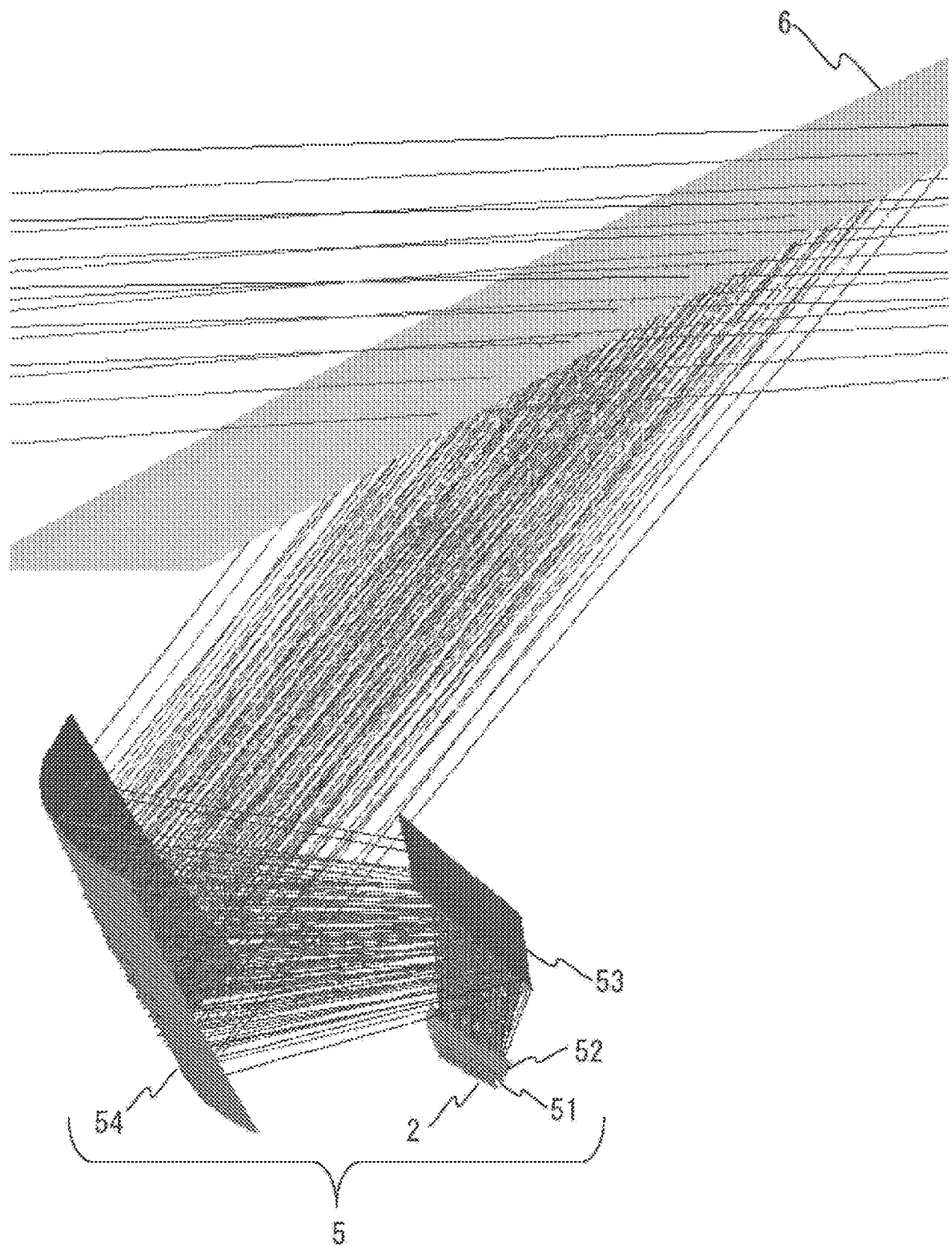
FIG. 2 is a partially enlarged diagram illustrating the eyepiece optical system according to the first embodiment.

FIG. 2 is a partially enlarged diagram illustrating the eyepiece optical system 5 according to the first embodiment. As illustrated in FIG. 2, the eyepiece optical system 5 is configured by successively placing a polarization unit 51, the concave lens 52, the folding mirror 53, the concave mirror 54 having positive refractive power, and the windshield 6 in order from the liquid crystal display panel 2. The concave mirror 54 mainly supplies the refractive power for the eyepiece optical system 5. The concave lens 52 mainly provides telecentricity and mainly corrects distortion together with the folding mirror 53. The reflecting mirror 53 is disposed below an optical path (lower side in the Y-axis) between the windshield 6 and the concave mirror 54 so that the optical path of the image light is folded mainly in the Z-direction and thus the length in the Z-direction in the total optical path length is shortened. With this configuration, it is possible to reduce the size of the head-up display 30.

The polarization unit 51 comprises two flat plates and a wire-grid type polarization element in a space therebetween. The polarization unit 51 attenuates a polarization light which is different from the image light emitted from the liquid crystal display panel 2, and thereby even when the solar light is condensed on the liquid crystal display panel 2, it suppresses temperature increase of the liquid crystal display panel 2.

FIG. 3 illustrates lens data of the head-up display 30 according to the first embodiment. In the lens data of FIG. 3, "curvature radius" represents a positive sign when the center position of the curvature radius belongs to a traveling direction while "interplanar distance" represents a distance on the optical axis between a vertex position on each plane and a vertex position on the next plane. In this connection, in the reflection optical system, the signs of the radius curvature are reversed at a point where the interplanar distance is a negative value.

"Decentering" represents values corresponding to the directions along the X-, Y-, and Z-axes. "Tilting" represents rotations around the X-, Y-, and Z-axes. "Decentering and tilting" act on the relevant plane in the order of decentering and tilting. "Normal decentering" signifies that the next plane is placed at the position corresponding to an interplanar distance in a new coordinate system where decentering and tilting have acted. "Decentering and return" signifies that decentering and tilting act only on the relevant plane and does not affect the next plane. A clockwise rotation around the X-axis is positive when viewed in the positive direction of the X-axis. A clockwise rotation around the Y-axis is positive when viewed in the positive direction of the Y-axis. A counterclockwise rotation around the Z-axis is positive when viewed in the positive direction of the Z-axis.

"Glass material name 54.57" signifies a material having a refractive index of 1.54 and Abbe number 57, "Glass material name 50.30" signifies a material having a refractive index of 1.50 and Abbe number 30, and "Glass material name 52.649" signifies a material having a refractive index of 1.52 and Abbe number 64.9.

In the present embodiment, the concave mirror 54 and the folding mirror 53 have free curved surface shape, so that excellent distortion correction performance and a spot diagram, which will be described later, can be realized while telecentricity can be secured.

FIG. 4 illustrates free curved surface coefficients for the eyepiece optical system according to the first embodiment. The free curved surface coefficients in FIG. 4 can be obtained by the formula 1 below.

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n)$$
$$j = [(m+n)^2 + m + 3n]/2 + 1$$
[Formula 1]

In the formula 1, free curved surface coefficient $Cj$ represents shape rotationally asymmetric with each optical axis (Z-axis). The shape is defined by components of the cone term and components of the XY polynomial term. For example, given that X is squared (m=2) and Y is cubic (n=3), then, $j = \{(2+3)^2 + 2 + 3\times 3\}/2 + 1 = 19$. The corresponding coefficient is $C_{19}$. Optical axis positions on the free curved surface depend on the amount of "decentering and tilting" in the lens data in FIG. 3.

In the following, specific numeric values of such as eye box size and a viewing angle in the eyepiece optical system according to the present embodiment will be sequenced in the order of the horizontal direction and the vertical direction.

Eye box size: 120×60 mm
Effective size of image light in liquid crystal display panel: 36.1×19.5 mm
Virtual image size: 489×209 mm
Viewing angle (total angle of view): 7×3 degrees
Inclination: 2.9 degrees
Virtual image distance: 4.0 m (inclination direction)

Next, the optical performance according to the first embodiment will be described below with reference to FIGS. 5 to 7.

Figure 5:
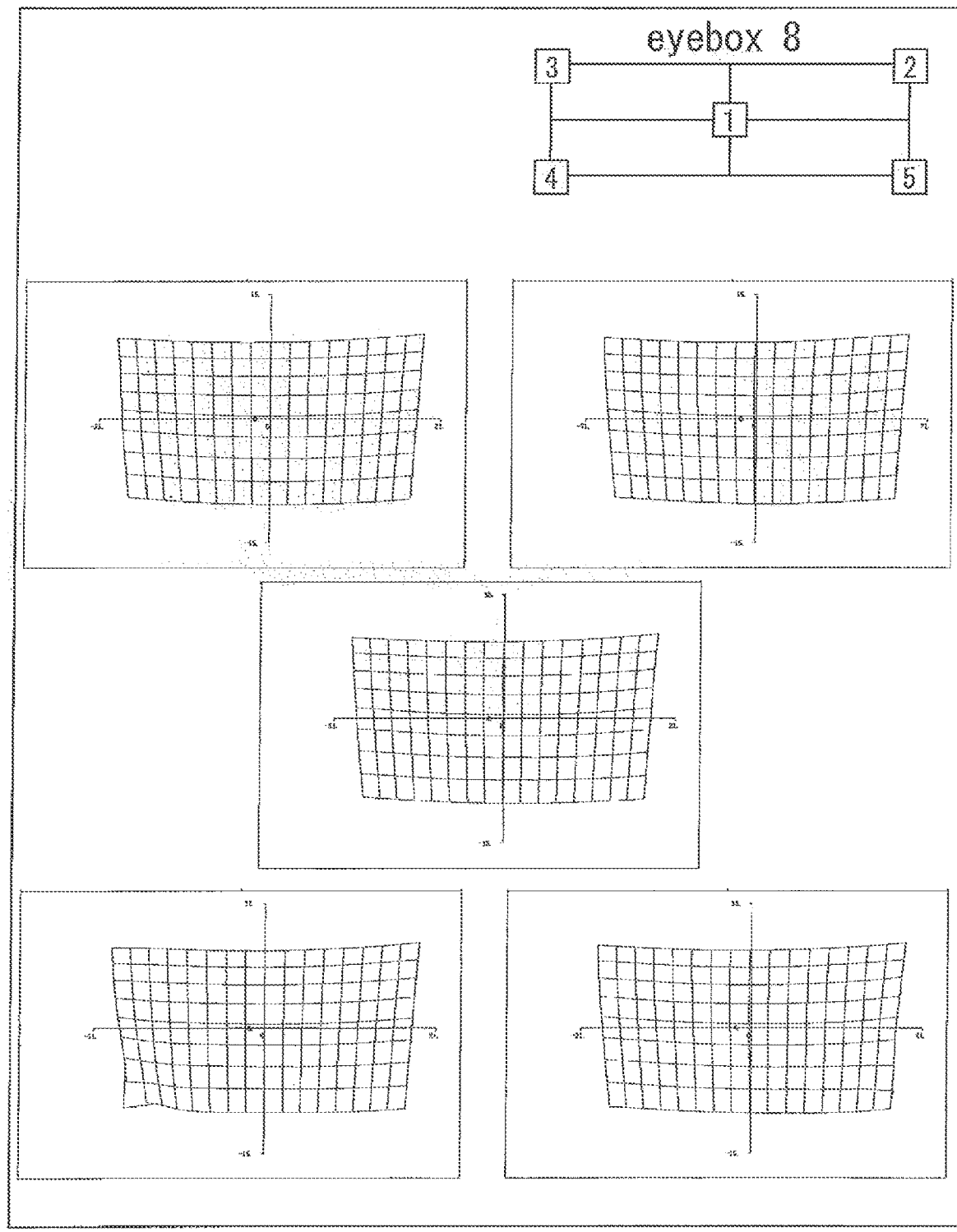
FIG. 5 illustrates distortion performance viewed from specific portions of an eye box according to the first embodiment.

FIG. 5 illustrates distortion performance viewed from specific portions of the eye box according to the first embodiment. FIG. 5 provides distortion diagrams at the liquid crystal display panel 2 based on a light passing through the center and four corners of the eye box 8 within the rectangular virtual image range. Suppose the eye 9 is placed at the respective positions in the eye box 8 while the liquid crystal display panel 2 displays a rectangular image. In such a case, distortion opposite to that illustrated in FIG. 5 is observed (such as barrel-shaped ⇔ bobbin-shaped). The distortion diagrams in FIG. 5 represents the almost equal shape, and therefore, an observer can observe a rectangular virtual image with no distortion when the liquid crystal display panel 2 displays image corresponding to the distortion diagrams in FIG. 5.

Figure 6:
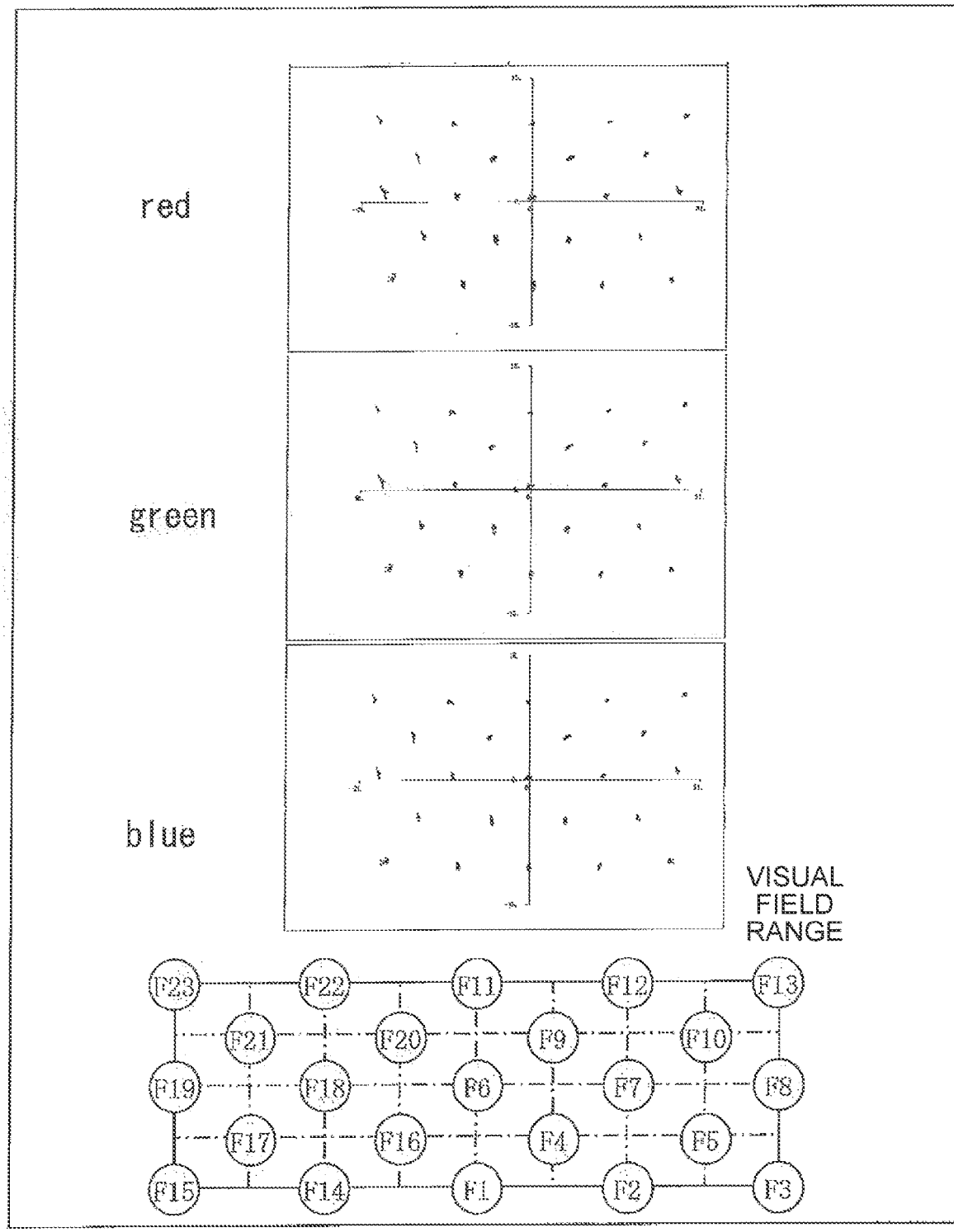
FIG. 6 is a spot diagram illustrating each color in the eyepiece optical system according to the first embodiment.

FIG. 6 is a spot diagram illustrating each color in the eyepiece optical system according to the first embodiment. FIG. 6 provides a spot diagram on the liquid crystal display panel 2 when object points are placed on the virtual image plane, which is separated into red color (650 nm), green color (550 nm), and blue color (450 nm) based on light flux passing through the whole of the eye box 8. This spot diagram uses all light flux through the eye box 8 sized 120 mm horizontally and 60 mm vertically. When the observer actually views a virtual image, the spot diagram is greatly improved based on the iris size (supposed to be φ7 mm at a maximum) of the human eye. The spot diagram is created by magnifying five times a spot diagram at each point of the liquid crystal display panel 2 in an optical reduction system using the virtual image as an object surface.

Figure 7A:
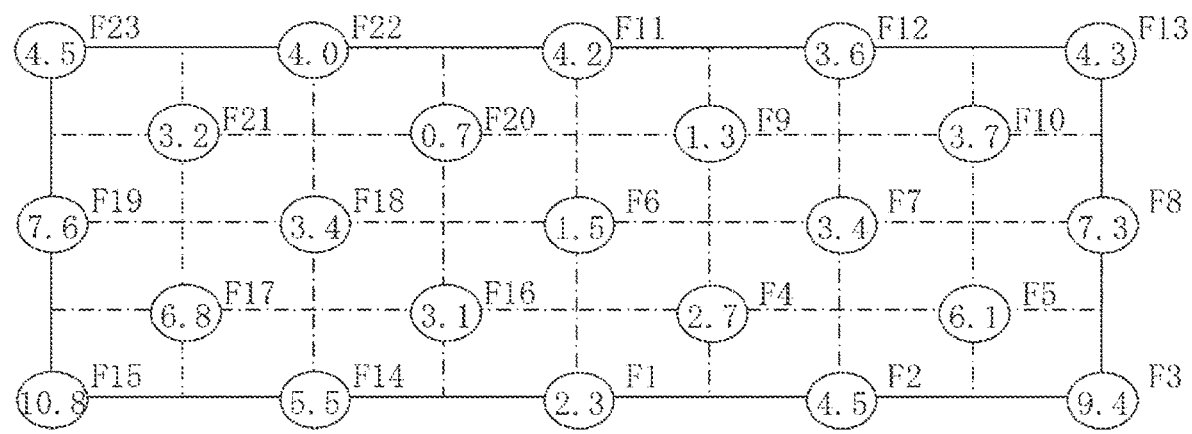
FIG. 7A illustrates deviation of angles of a principal ray according to the first embodiment.
Figure 7B:
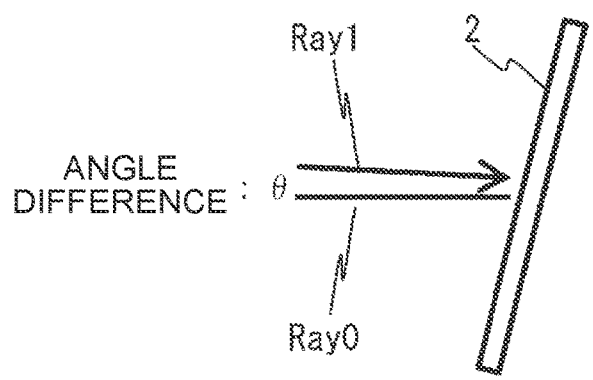
FIG. 7B illustrates an angle θ between a principal ray Ray1 and a virtual ray Ray0.
Figure 7C:
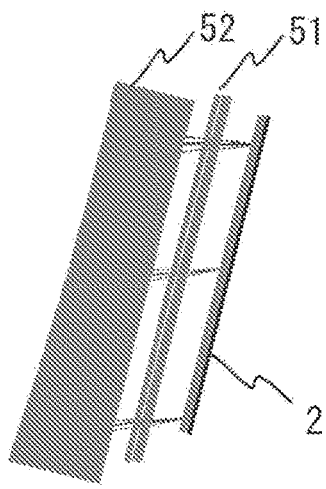
FIG. 7C illustrates arrangement order of a liquid crystal display panel, a polarization unit, and a concave lens.

FIG. 7A illustrates deviation of angles between a principal ray Ray1 and a virtual ray Ray0 at each angle of view. FIG. 7B illustrates an angle θ between the principal ray Ray1 and the virtual ray Ray0. FIG. 7C illustrates arrangement order of the liquid crystal display panel, the polarization unit, and the concave lens.

As illustrated in FIG. 7B, the virtual ray Ray0 corresponds to a straight line resulting from rotating the normal line of the liquid crystal display panel 2 by 19 degrees around the rotation axis parallel to the long side of the liquid crystal display panel 2. This signifies that an illumination optical system is tilted at 19 degrees against the liquid crystal display panel 2. With this configuration, even when the sun is located above the automobile 500 and the solar light which has been passed through the windshield 6 is reflected by the concave mirror 54 and reaches the liquid crystal display panel 2, because the solar light is obliquely made incident on the liquid crystal display panel 2, its reflecting direction is different from the direction of the concave mirror 54 and thus does not reach the eye box 8. In addition, another reason why the liquid crystal display panel 2 is tilted with respect to the light flux as illustrated in FIGS. 7B and 7C is to prevent from the image of the solar light reflected by the liquid crystal display panel 2 being overlapped with the virtual image and displayed, because, when the sun is located on an extension line of the light between the concave mirror 54 and the windshield 6, the solar light which has been passed through the transflective windshield 6 reaches the liquid crystal display panel 2. This condition is necessary in all the light flux ranges of the liquid crystal display panel 2, and is evaluated in a two-dimensional position as illustrated in FIG. 7A.

According to the present embodiment, telecentricity can be secured by the action of the concave lens as well as by forming at least one of the concave mirror and the folding mirror into the free curved surface shape, while the size of the projection optical system can be reduced by arranging the folding mirror between the concave mirror and the concave lens. As a result, it is possible to reduce the size of the head-up display 30.

Second Embodiment

The second embodiment is characterized in that the configuration of the eyepiece optical system 5 differs from that of the first embodiment. In the second embodiment, an example of the head-up display 30 in which the distance to a vehicle located ahead of the travelling automobile is assumed and the virtual image distance is greatly increased to 20 m will be described.

Figure 8A:
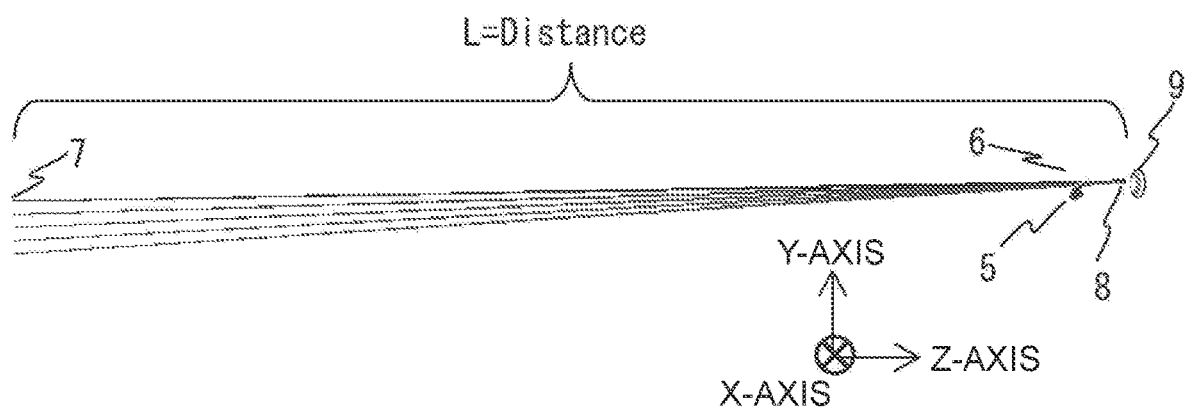
FIG. 8A is an overall ray diagram (YZ-plane) illustrating an eyepiece optical system according to a second embodiment.
Figure 8B:
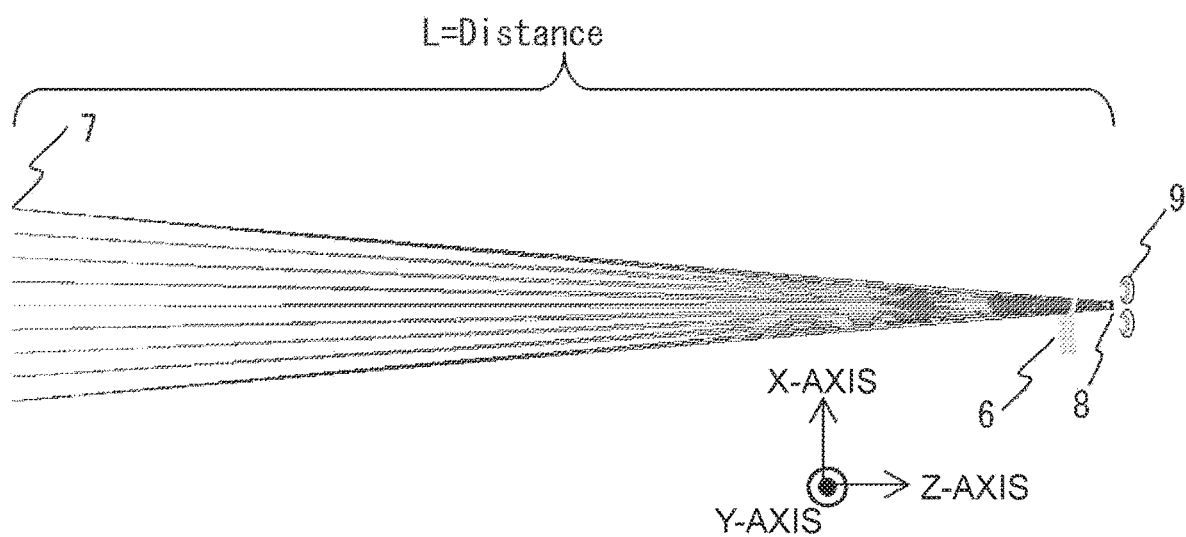
FIG. 8B is an overall ray diagram (XZ-plane) illustrating an eyepiece optical system according to a second embodiment.

FIG. 8 is an overall ray diagram illustrating the eyepiece optical system 5 according to the second embodiment. Especially, FIG. 8A illustrates an aspect in which the observer's eye 9 is directed to image information on the virtual image plane 7 on the YZ-plane defined by the horizontal X-axis, the vertical Y-axis, and the Z-axis orthogonal to the XY-axes with reference to the eye box 8. FIG. 8B illustrates an aspect in which the observer's eye 9 is directed to image information on the virtual image plane 7 viewed on the XZ-plane.

Figure 9:
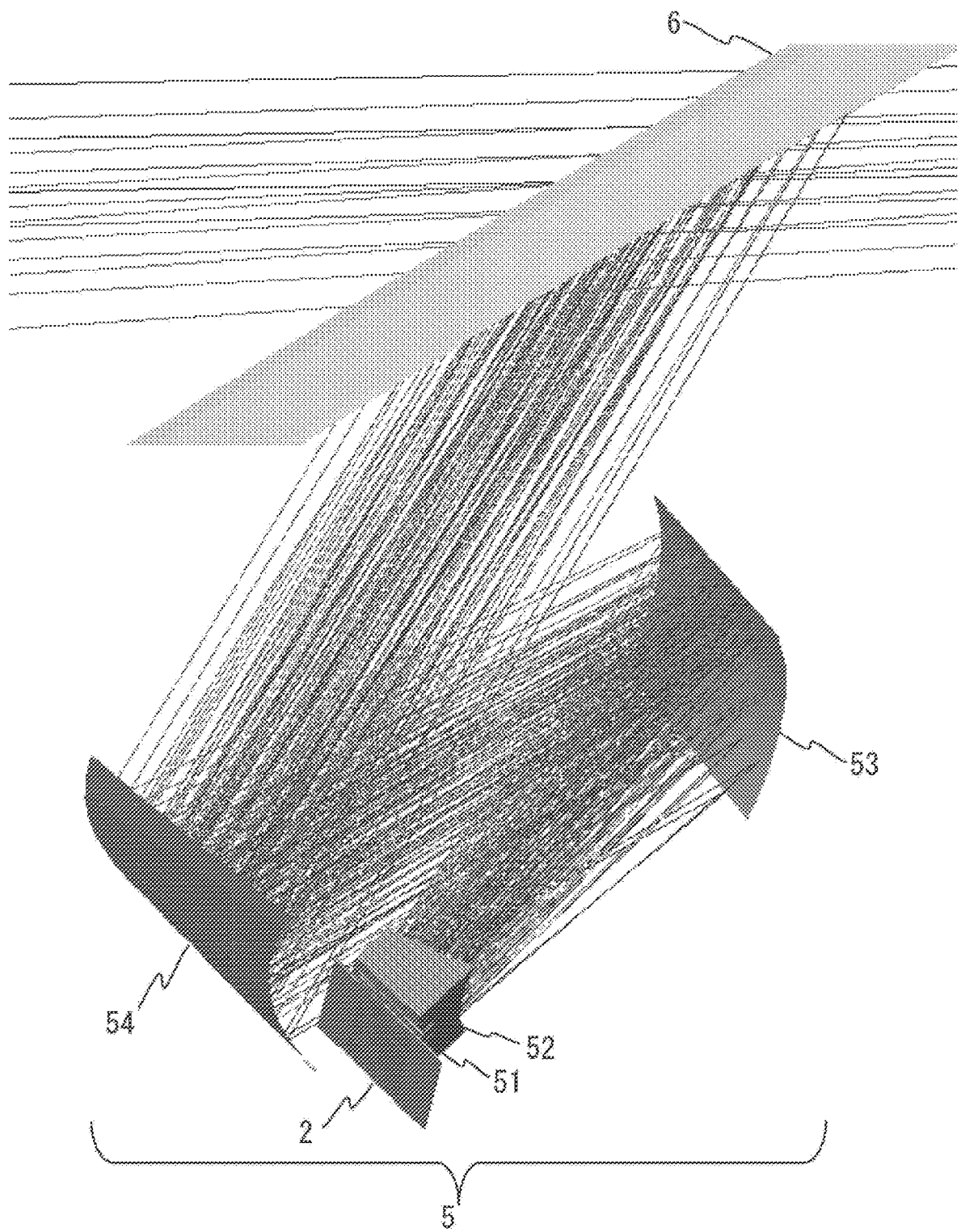
FIG. 9 is a partially enlarged diagram illustrating the eyepiece optical system according to the second embodiment.

FIG. 9 is a partially enlarged diagram illustrating the eyepiece optical system according to the second embodiment. As illustrated in FIG. 9, the eyepiece optical system 5 is configured by successively placing the polarization unit 51, the concave lens 52, the folding mirror 53, the concave mirror 54 having positive refractive power and the windshield 6 in order from the liquid crystal display panel 2.

In the present embodiment, the concave mirror 54 and the folding mirror 53 are formed into free curved surface shape so that telecentricity can be secured while excellent distortion correction performance and a spot diagram, which will be described later, can be realized.

FIG. 10 illustrates lens data of the eyepiece optical system according to the second embodiment. FIG. 11 illustrates free curved surface coefficients for the eyepiece optical system according to the second embodiment.

In the following, specific numeric values of such as eye box size and a viewing angle in the eyepiece optical system according to the second embodiment will be sequenced in the order of the horizontal direction and the vertical direction.

Figure 12:
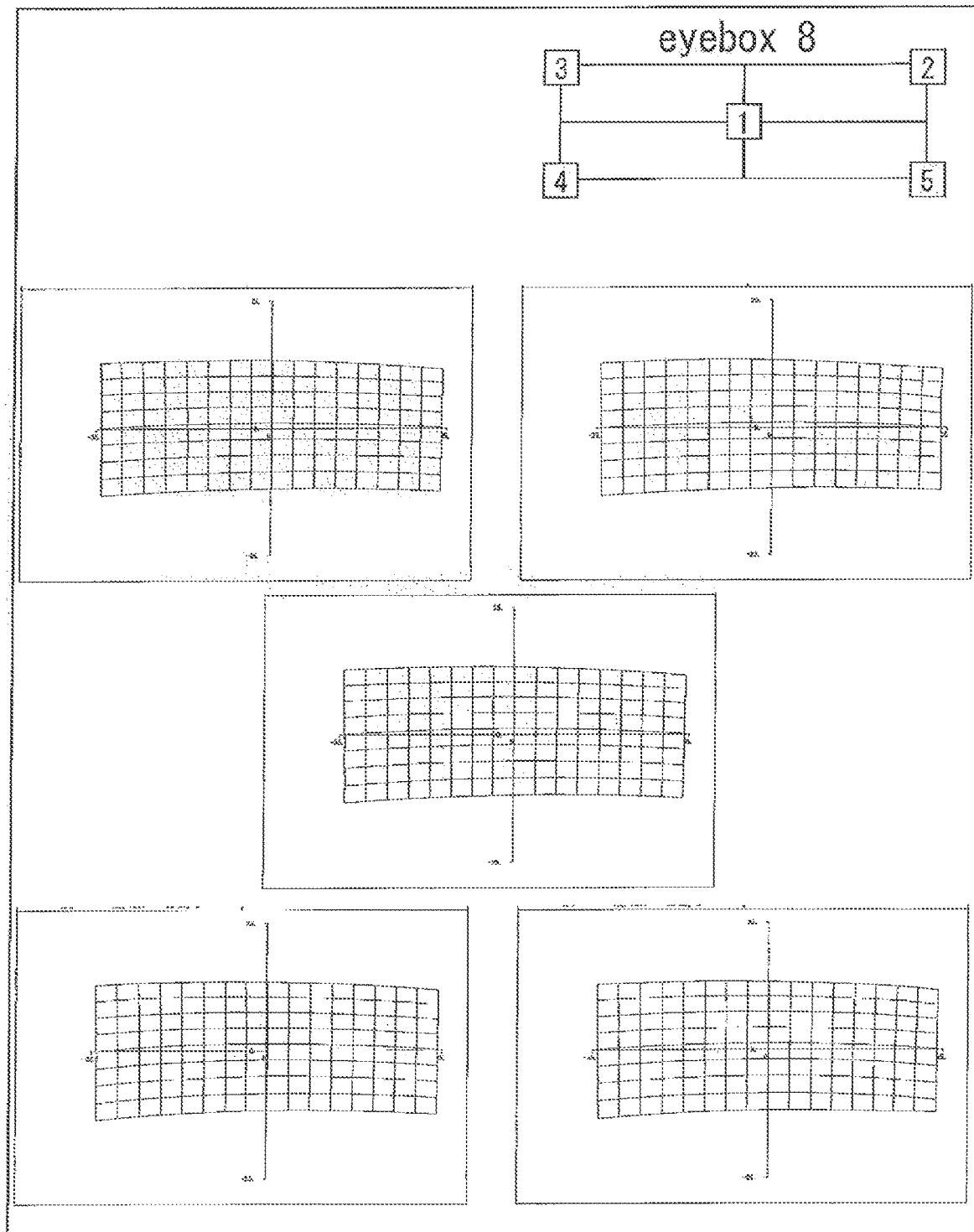
FIG. 12 illustrates distortion performance viewed from specific portions of an eye box according to the second embodiment.
Figure 13:
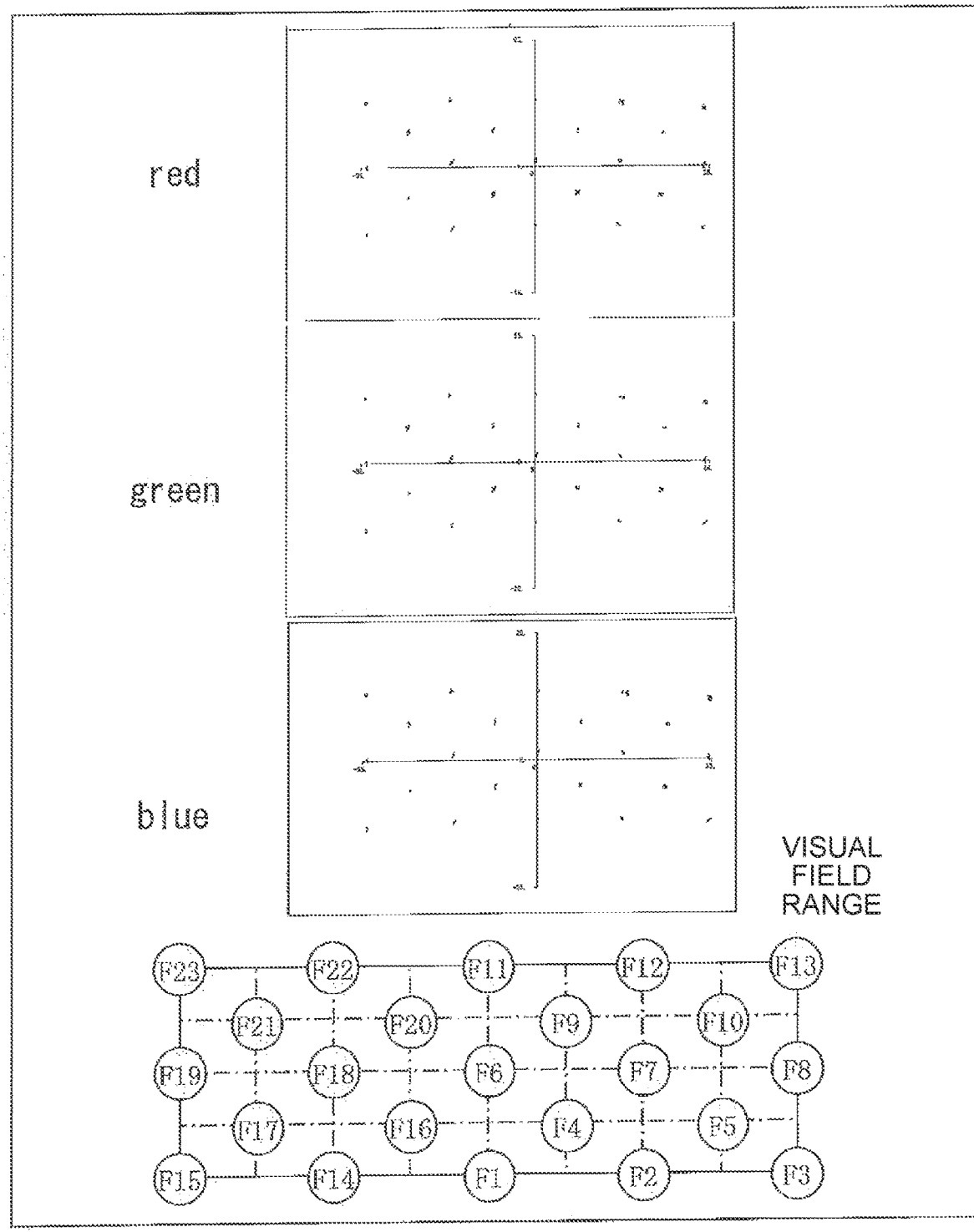
FIG. 13 is a spot diagram illustrating each color in the eyepiece optical system according to the second embodiment.
Figure 14A:
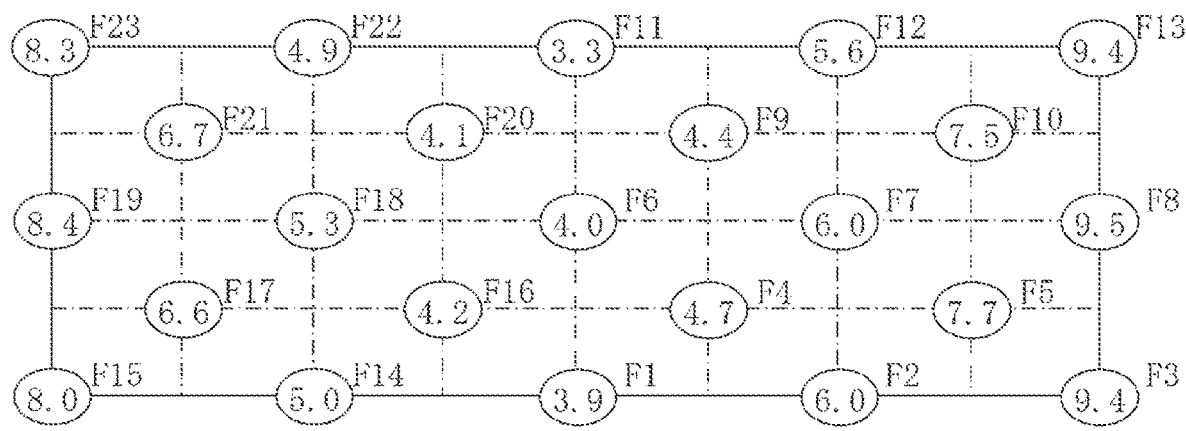
FIG. 14A illustrates deviation of angles of a principal ray according to the second embodiment.
Figure 14B:
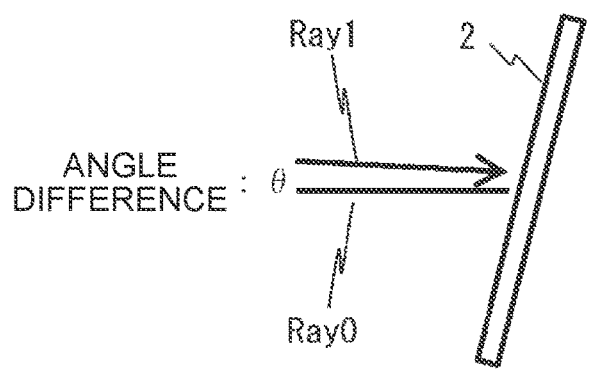
FIG. 14B illustrates an angle θ between a principal ray Ray1 and a virtual ray Ray0.
Figure 14C:
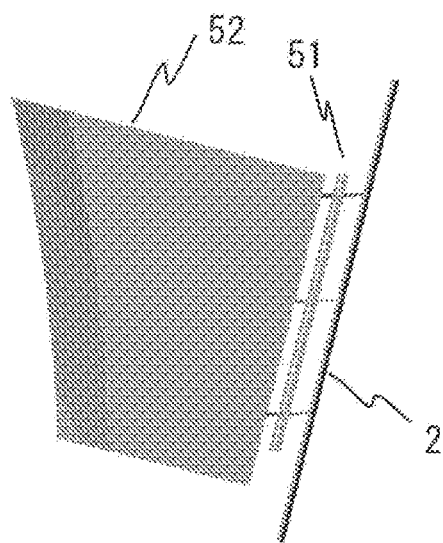
FIG. 14C illustrates arrangement order of a liquid crystal display panel, a polarization unit, and a concave lens.

Eye box size: 130×40 mm
Effective size of image light in liquid crystal display panel: 68.0×25.2 mm
Virtual image size: 3500×943 mm
Viewing angle (total angle of view): 10.0×2.7 degrees
Inclination: 2.376 degrees
Virtual image distance: 20.0 m Next, the optical performance according to the second embodiment will be described below with reference to FIGS. 12 to 14. FIG. 12 illustrates distortion correction performance viewed from specific portions of the eye box according to the second embodiment. FIG. 13 is a spot diagram illustrating each color in the eyepiece optical system according to the second embodiment. FIG. 14A illustrates deviation of angles of the principal ray according to the second embodiment. FIG. 14B illustrates an angle θ between the principal ray Ray1 and the virtual ray Ray0. FIG. 14C illustrates arrangement order of the liquid crystal display panel, the polarization unit, and the concave lens.

As illustrated in FIG. 14B, the virtual ray Ray0 corresponds to a straight line resulting from rotating the normal line of the liquid crystal display panel 2 by 14 degrees around the rotation axis parallel to the long side of the liquid crystal display panel 2. This signifies that an illumination optical system is tilted at 14 degrees against the liquid crystal display panel 2. The reason why the angle 14 degrees is smaller than the angle 19 degrees in the first embodiment is that the effective size of the image light on the liquid crystal display panel 2 is increased in the second embodiment. As a result, the F value on the side of the liquid crystal display panel 2 is increased. That is, because the solid angle on the side of the liquid crystal display panel 2 side is small, even when the angle is set to be 14 degrees, the reflected solar light does not reach the eye box 8.

In this way, according to the present embodiment, a head-up display 30 having a large virtual image distance can be provided by a projection optical system using a concave mirror and a concave lens.

In addition, in the present embodiment, telecentricity can be secured by arranging the concave lens while the size of the head-up display itself can be reduced by folding the optical path by using the folding mirror.

Third Embodiment

Figure 17:
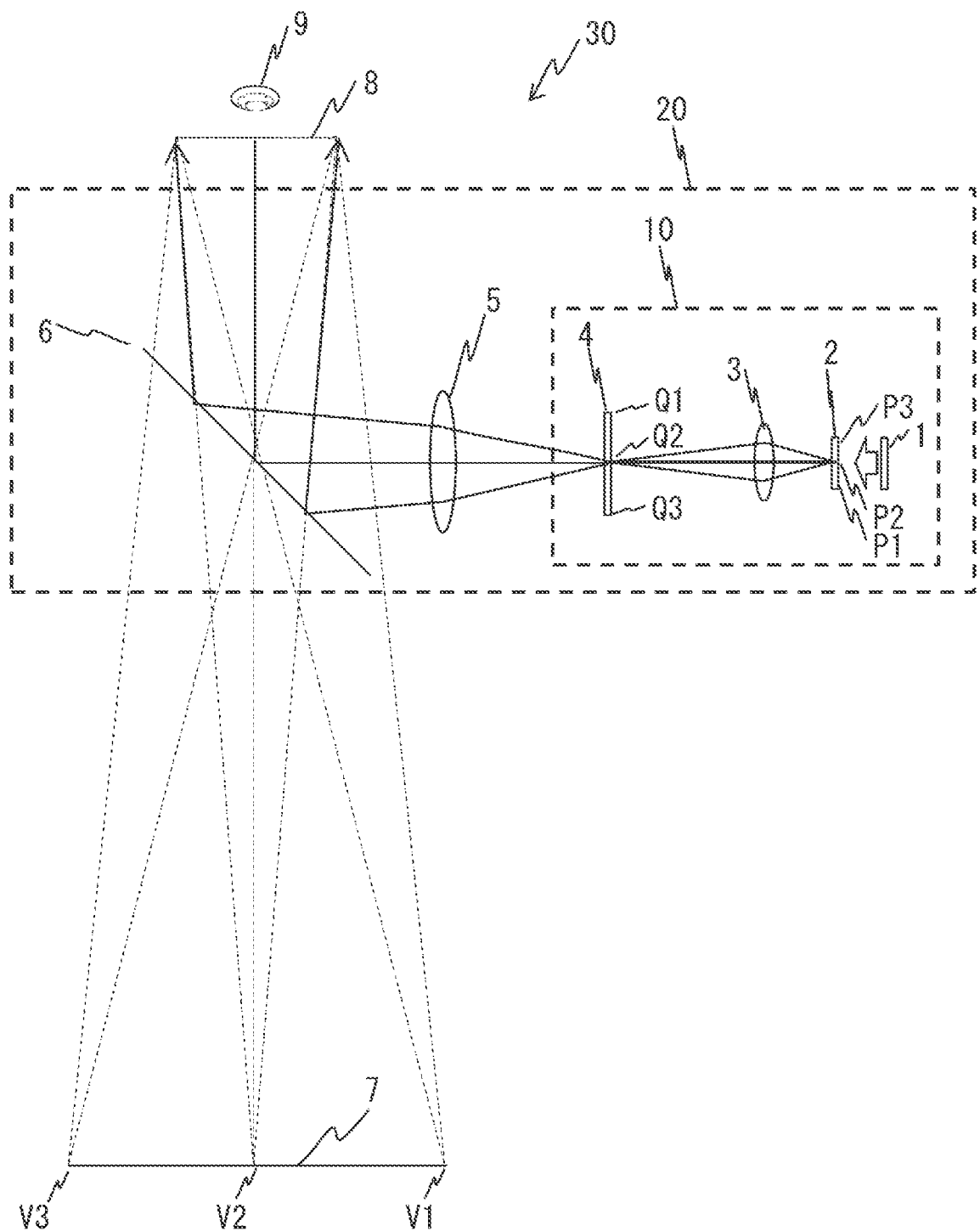
FIG. 17 is a schematic configuration diagram illustrating an image forming unit as another example of a head-up display according to the present embodiments.

The third embodiment illustrated in FIG. 17 is characterized in that the configuration of the image forming unit 10 differs from that of the first and second embodiments. That is, according to the first embodiment, the eyepiece optical system 5 directly enlarges the image information on the liquid crystal display panel 2 and displays it as a virtual image. Instead of this configuration of the image forming unit 10, a light valve is used as a light source. A relay optical system 3 enlarges and maps the image information on a screen plate (diffusion plate) by using the more small-sized liquid crystal display panel 2. The eyepiece optical system enlarges the image information and displays it as a virtual image.

In the head-up display 30 of FIG. 17, the principal point position of the relay optical system 3 is adjusted to a position assumed on the side of the eyepiece optical system 5. The control is performed by arranging a field lens in front of the screen plate 4.

In more detail, the backlight 1 radiates a light flux to the liquid crystal display panel 2. The light flux is assumed to be an image light flux containing the image information displayed on the liquid crystal display panel 2 and enters the relay optical system 3. The image information on the liquid crystal display panel 2 is enlarged due to image formation action of the relay optical system 3 and is projected, while enlarged, onto a screen plate (diffusion plate) 4. Points P1, P2, and P3 on the liquid crystal display panel 2 correspond to points Q1, Q2, and Q3 on the screen plate (diffusion plate) 4. A small-sized liquid crystal display panel can be used by using the relay optical system 3. The backlight 1, the liquid crystal display panel 2, the relay optical system 3, and the screen plate (diffusion plate) 4 form image information on the screen plate (diffusion plate) 4, which are generically called the image forming unit 10.

In this connection, the screen plate (diffusion plate) 4 is constituted by a microlens array including two-dimensionally placed microlenses. This causes the diffusion to increase a spread angle of the light flux exiting from the screen plate 4 and ensure the specified size of the eye box 8. Furthermore, the diffusion of the screen plate (diffusion plate) 4 can be achieved also by incorporating diffusion particles.

By arranging the concave lens and the folding mirror on the front side along the light emission direction of the image forming unit 10 including the backlight and the liquid crystal display panel, telecentricity can be secured while by folding the optical path, the size of the head-up display itself can be reduced.

Fourth Embodiment

Figure 18:
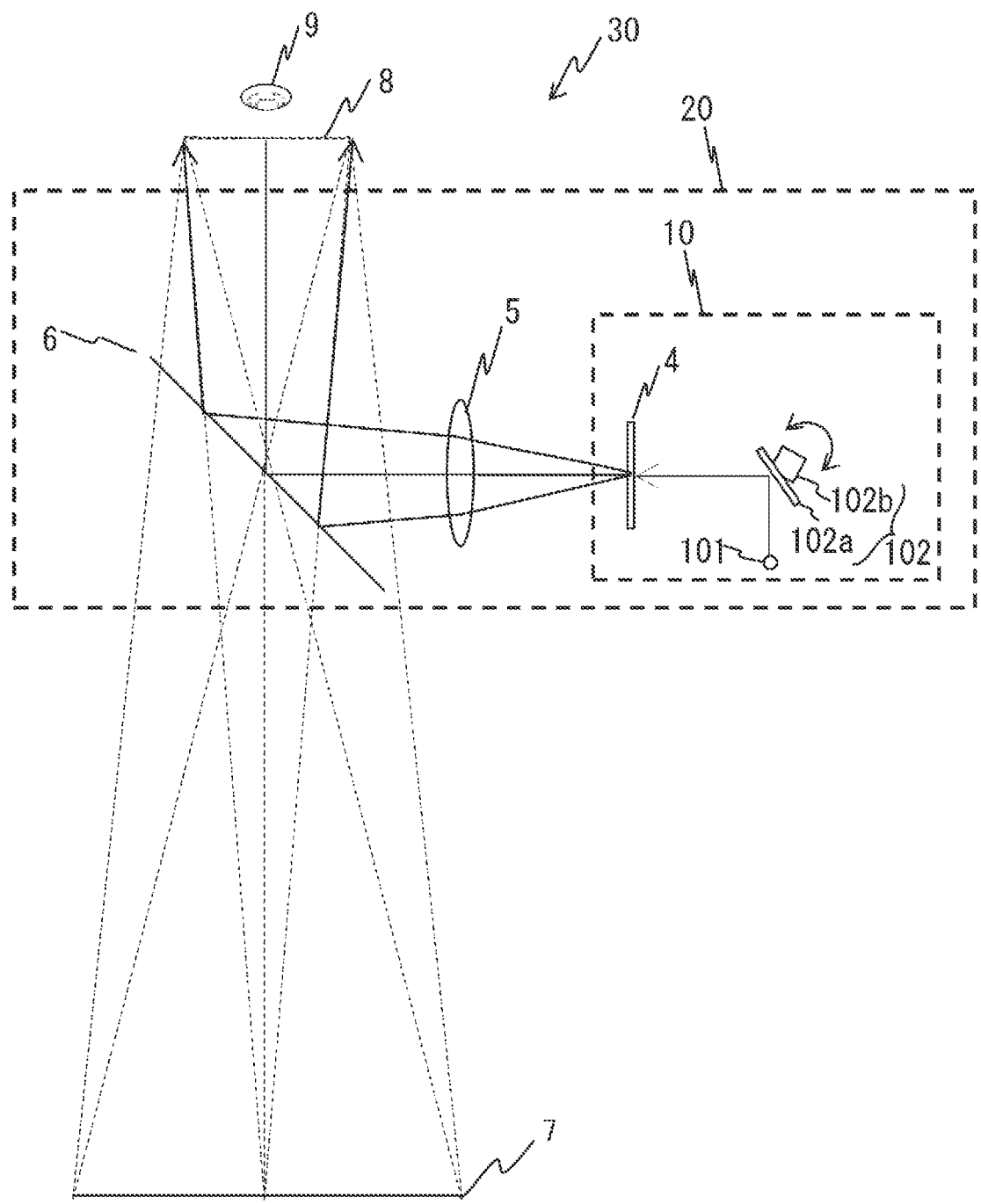
FIG. 18 is a schematic configuration diagram illustrating an image forming unit as still another example of a head-up display according to the present embodiments.

The fourth embodiment illustrated in FIG. 18 is characterized in that the configuration of the image forming unit 10 differs from that of the first and second embodiments. That is, the first embodiment maps image information of the liquid crystal display panel 2 onto the screen plate 4 having the diffusion capability. This configuration of the image forming unit 10 may be replaced by optically scanning a laser light source and thereby forming an optical scanning image on the screen plate 4 having the diffusion capability. The image forming unit according to the fourth embodiment may use a Micro-Electro-Mechanical System (MEMS) 102. The MEMS 102 includes a laser light source 101, a reflection surface 102a, and an optical scanning unit 102b configured to perform optical scanning by rotating the reflection surface 102a. By the MEMS, the light angle is swung and a position where the optical scanning is performed is arranged in accordance with the position of the exit pupil. Furthermore, the rotation center position of the MEMS 102 is adjusted to a position assumed on the side of the eyepiece optical system 5.

By arranging the concave lens and the folding mirror on the front side along the light emission direction of the image forming unit 10 including the MEMS, telecentricity can be secured while by folding the optical path, the size of the head-up display itself can be reduced.

The embodiments above are not intended to limit the present invention, and various modifications that do not deviate from the technical concept of the present invention are included in the present invention. For example, the present invention is characterized by comprising a concave lens and a folding mirror, but does not prevent other optical components from being on an optical path.

REFERENCE SIGNS LIST

1 backlight
2 liquid crystal display panel
3 relay optical system
4 screen plate (diffusion plate)
5 eyepiece optical system
6 windshield
7 virtual image plane
8 eye box
9 observer's eye
10 image forming unit
20 projection optical system
30 head-up display
51 polarization unit
52 concave lens
53 folding mirror
54 concave mirror
1001 condensing position
1008 diaphragm
1002 image plane
1052 concave lens
1053 optical element
1054 convex lens

The invention claimed is:

1. A projection optical system comprising an eyepiece optical system configured to refract and reflect image light emitted from an image forming unit for forming image information to display a virtual image, wherein
the eyepiece optical system includes at least a concave lens, a folding mirror, and a concave mirror which are successively placed in order from the image forming unit,
of the concave lens and the folding mirror, at least the folding mirror has a free curved surface shape, the folding mirror being arranged separately from the concave lens,
the concave lens is arranged, relative to an emission direction of the image light, downstream of an image plane of a liquid crystal display panel of the image forming unit and has a focal distance corresponding to a distance between the image plane and a condensing position that is upstream of the image plane,
the concave lens has a first surface which is concave and a second surface which is not concave, and the second surface is arranged adjacent to and facing the liquid crystal display panel, and
a polarization unit is positioned between the liquid crystal display panel and the concave lens, the polarization unit being configured to attenuate polarization light different from the image light emitted from the image forming unit.

2. A head-up display comprising:
an image forming unit configured to emit image light including image information; and
an eyepiece optical system configured to refract and reflect the image light emitted from the image forming unit to display a virtual image, wherein
the image forming unit includes a backlight and a liquid crystal display panel,
the eyepiece optical system includes at least a concave lens, a folding mirror, and a concave mirror which are successively placed in order close to the liquid crystal display panel along an emission direction of the image light,
of the concave lens and the folding mirror, at least the folding mirror has a free curved surface shape, the folding mirror being arranged separately from the concave lens,
the concave lens is arranged, relative to the emission direction of the image light, downstream of an image plane of the liquid crystal display panel of the image forming unit and has a focal distance corresponding to a distance between the image plane and a condensing position that is upstream of the image plane, the concave lens has a first surface which is concave and a second surface which is not concave, and the second surface is arranged adjacent to and facing the liquid crystal display panel, and a polarization unit is positioned between the liquid crystal display panel and the concave lens, the polarization unit being configured to attenuate polarization light different from the image light emitted from the image forming unit.

3. A head-up display comprising:

an image forming unit configured to emit image light including image information; and an eyepiece optical system configured to refract and reflect the image light emitted from the image forming unit to display a virtual image, wherein the image forming unit includes a relay optical system configured to form an image of a light valve and a screen plate having a diffusion capability, the eyepiece optical system includes at least a concave lens, a folding mirror, and a concave mirror which are successively placed in order close to the image forming unit along an emission direction of the image light, of the concave lens and the folding mirror, at least the folding mirror has a free curved surface shape, the folding mirror being arranged separately from the concave lens, the concave lens is arranged, relative to the emission direction of the image light, downstream of an image plane of a liquid crystal display panel of the image forming unit and has a focal distance corresponding to a distance between the image plane and a condensing position that is upstream of the image plane, the concave lens has a first surface which is concave and a second surface which is not concave, and the second surface is arranged adjacent to and facing the liquid crystal display panel, and a polarization unit is positioned between the liquid crystal display panel and the concave lens, the polarization unit being configured to attenuate polarization light different from the image light emitted from the image forming unit.

4. A head-up display comprising:

an image forming unit configured to emit image light including image information; and an eyepiece optical system configured to refract and reflect the image light emitted from the image forming unit to display a virtual image, wherein the image forming unit includes:
  a laser light source;
  an optical scanning unit configured to perform optical scanning of the laser light source by rotation of a reflection surface; and
  a screen plate configured to diffuse an emission light from the laser light source, the eyepiece optical system includes at least a concave lens, a folding mirror, and a concave mirror which are successively placed in order close to the image forming unit along an emission direction of the image light, of the concave lens and the folding mirror, at least the folding mirror has a free curved surface shape, the folding mirror being arranged separately from the concave lens, the concave lens is arranged, relative to the emission direction of the image light, downstream of an image plane of a liquid crystal display panel of the image forming unit and has a focal distance corresponding to a distance between the image plane and a condensing position that is upstream of the image plane, the concave lens has a first surface which is concave and a second surface which is not concave, and the second surface is arranged adjacent to and facing the liquid crystal display panel, and a polarization unit is positioned between the liquid crystal display panel and the concave lens, the polarization unit being configured to attenuate polarization light different from the image light emitted from the image forming unit.

* * * * *